(12) United States Patent
Morrell et al.

(10) Patent No.: US 11,360,631 B2
(45) Date of Patent: Jun. 14, 2022

(54) CONFIGURABLE FORCE-SENSITIVE INPUT STRUCTURE FOR ELECTRONIC DEVICES

(71) Applicant: Apple Inc., Cupertino, CA (US)

(72) Inventors: John B. Morrell, Los Gatos, CA (US); Ron A. Hopkinson, Campbell, CA (US); Peter M. Arnold, Cupertino, CA (US); Mikael M. Silvanto, San Francisco, CA (US); William F. Leggett, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/203,363

(22) Filed: Mar. 16, 2021

(65) Prior Publication Data

US 2021/0200385 A1 Jul. 1, 2021

Related U.S. Application Data

(63) Continuation of application No. 14/867,407, filed on Sep. 28, 2015, now Pat. No. 10,963,117.

(Continued)

(51) Int. Cl.
*G06F 3/041* (2006.01)
*G06F 3/044* (2006.01)
(Continued)

(52) U.S. Cl.
CPC ............ *G06F 3/0447* (2019.05); *G06F 1/169* (2013.01); *G06F 1/1662* (2013.01); *G06F 3/016* (2013.01);
(Continued)

(58) Field of Classification Search
CPC .... G06F 3/0447; G06F 3/0445; G06F 1/1662; G06F 1/169; G06F 3/016; G06F 3/017;
(Continued)

(56) References Cited

U.S. PATENT DOCUMENTS 5,212,356 A 5/1993 English
5,541,372 A 7/1996 Baller
(Continued)

FOREIGN PATENT DOCUMENTS

CN 1862732 11/2006
CN 101071354 11/2007
(Continued)

OTHER PUBLICATIONS

Rekimoto, Jun, "Thumbsense: Automatic Input Mode Sensing for Touch-Based Interactions," Interaction Laboratory, Sony Computer & Science Laboratories, Inc., 2 pages, Apr. 2003.

*Primary Examiner* — Carolyn R Edwards
(74) *Attorney, Agent, or Firm* — Brownstein Hyatt Farber Schreck, LLP

(57) ABSTRACT

A configurable, force-sensitive input structure for an electronic device is disclosed. The input structure has a metal contact layer, a sense layer positioned below the metal contact layer, and a drive layer capacitively coupled to the sense layer. The input structure may also have a compliant layer positioned between and coupled to the sense layer and the drive layer, a rigid base layer positioned below the drive layer, and a set of supports positioned between the metal contact layer and the rigid base layer.

20 Claims, 17 Drawing Sheets

Related U.S. Application Data

(60) Provisional application No. 62/057,425, filed on Sep. 30, 2014, provisional application No. 62/057,350, filed on Sep. 30, 2014.

(51) Int. Cl.
  *G06F 3/04886* (2022.01)
  *G06F 1/16* (2006.01)
  *G06F 3/0354* (2013.01)
  *G06F 3/01* (2006.01)
  *G06F 3/02* (2006.01)

(52) U.S. Cl.
  CPC ............ *G06F 3/017* (2013.01); *G06F 3/0213* (2013.01); *G06F 3/03547* (2013.01); *G06F 3/041* (2013.01); *G06F 3/0445* (2019.05); *G06F 3/04886* (2013.01); *G06F 2203/04102* (2013.01); *G06F 2203/04106* (2013.01)

(58) Field of Classification Search
  CPC .... G06F 3/0213; G06F 3/03547; G06F 3/041; G06F 3/04886; G06F 2203/04102; G06F 2203/04106
  See application file for complete search history.

(56) References Cited

U.S. PATENT DOCUMENTS

| | | | |
|---|---|---|---|
| 5,748,177 | A | 5/1998 | Baker et al. |
| 5,920,303 | A | 7/1999 | Baker et al. |
| 6,029,214 | A | 2/2000 | Dorfman et al. |
| 6,429,846 | B2 | 8/2002 | Rosenberg et al. |
| 6,585,435 | B2 | 7/2003 | Fang |
| 6,757,002 | B1 | 6/2004 | Cross |
| 6,822,640 | B2 | 11/2004 | Derocher |
| 7,339,577 | B2 | 3/2008 | Sato |
| 7,364,337 | B2 | 4/2008 | Park |
| 7,364,339 | B2 | 4/2008 | Park |
| 7,538,760 | B2 | 5/2009 | Hotelling |
| 7,683,890 | B2 | 3/2010 | Geaghan |
| 7,834,855 | B2 * | 11/2010 | Hotelling ............ G06F 3/03547 345/173 |
| 7,839,379 | B1 | 11/2010 | Kerr |
| 7,843,438 | B2 | 11/2010 | Onoda |
| 7,847,789 | B2 | 12/2010 | Kolmykov-Zotov et al. |
| 7,884,315 | B2 | 2/2011 | Andre et al. |
| 7,893,921 | B2 | 2/2011 | Sato |
| 7,901,991 | B2 | 3/2011 | Bonucci et al. |
| 7,999,792 | B2 * | 8/2011 | Tsuji ............ G06F 1/169 345/168 |
| 8,022,942 | B2 | 9/2011 | Bathiche |
| 8,063,893 | B2 | 11/2011 | Rosenberg et al. |
| 8,077,057 | B2 | 12/2011 | Ohshita et al. |
| 8,098,233 | B2 | 1/2012 | Hotelling et al. |
| 8,321,810 | B2 | 11/2012 | Heintze |
| 8,330,725 | B2 | 12/2012 | Mahowald |
| 8,334,794 | B2 | 12/2012 | Watanabe |
| 8,335,996 | B2 | 12/2012 | Davidson et al. |
| 8,378,975 | B2 | 2/2013 | Yoon et al. |
| 8,381,118 | B2 | 2/2013 | Minton |
| 8,390,481 | B2 | 3/2013 | Pance et al. |
| 8,432,362 | B2 | 4/2013 | Cheng et al. |
| 8,436,816 | B2 | 5/2013 | Leung et al. |
| 8,441,790 | B2 | 5/2013 | Pance et al. |
| 8,502,800 | B1 | 8/2013 | Vier et al. |
| 8,537,132 | B2 | 9/2013 | Ng et al. |
| 8,537,140 | B2 | 9/2013 | Tsai et al. |
| 8,570,280 | B2 | 10/2013 | Stewart et al. |
| 8,592,699 | B2 | 11/2013 | Kessler |
| 8,599,141 | B2 | 12/2013 | Soma |
| 8,642,908 | B2 | 2/2014 | Moran et al. |
| 8,654,524 | B2 | 2/2014 | Pance et al. |
| 8,686,952 | B2 | 4/2014 | Burrough et al. |
| 8,723,824 | B2 | 5/2014 | Myers |
| 8,743,083 | B2 | 6/2014 | Zanone et al. |
| 8,749,523 | B2 | 6/2014 | Pance et al. |
| 8,766,922 | B2 | 7/2014 | Kim et al. |
| 8,782,556 | B2 | 7/2014 | Badger et al. |
| 8,786,568 | B2 | 7/2014 | Leung et al. |
| 8,804,347 | B2 | 8/2014 | Martisauskas |
| 8,854,325 | B2 | 10/2014 | Byrd et al. |
| 8,859,923 | B2 | 10/2014 | Obata |
| 8,870,812 | B2 | 10/2014 | Alberti et al. |
| 8,952,899 | B2 | 2/2015 | Hotelling |
| 8,960,934 | B2 | 2/2015 | Sung |
| 8,963,846 | B2 | 2/2015 | Lii et al. |
| 9,019,207 | B1 | 4/2015 | Hamburgen et al. |
| 9,019,710 | B2 | 4/2015 | Jeziorek |
| 9,028,123 | B2 | 5/2015 | Nichol et al. |
| 9,063,627 | B2 | 6/2015 | Yairi et al. |
| 9,098,120 | B2 | 8/2015 | Huh |
| 9,098,244 | B2 | 8/2015 | Roskind |
| 9,104,282 | B2 | 8/2015 | Ichikawa |
| 9,116,616 | B2 | 8/2015 | Kyprianou et al. |
| 9,122,330 | B2 | 9/2015 | Bau et al. |
| 9,195,354 | B2 | 9/2015 | Bulea et al. |
| 9,201,105 | B2 | 12/2015 | Iida et al. |
| 9,213,426 | B2 | 12/2015 | Clifton et al. |
| 9,223,352 | B2 | 12/2015 | Smith et al. |
| 9,244,490 | B2 | 1/2016 | Park |
| 9,250,738 | B2 | 2/2016 | Sharma |
| 9,304,599 | B2 | 4/2016 | Walline |
| 9,317,140 | B2 | 4/2016 | Rosenfeld |
| 9,367,146 | B2 | 6/2016 | Piot et al. |
| 9,367,158 | B2 | 6/2016 | Hotelling et al. |
| 9,400,579 | B2 | 7/2016 | Leung et al. |
| 9,460,029 | B2 | 10/2016 | Shaw et al. |
| 9,542,097 | B2 | 1/2017 | Ganey et al. |
| 9,543,948 | B2 | 1/2017 | Curtis et al. |
| 9,575,587 | B2 | 2/2017 | O'Keeffe |
| 9,635,267 | B2 | 4/2017 | Lee et al. |
| 9,640,347 | B2 | 5/2017 | Kwan |
| 9,753,569 | B2 | 9/2017 | Han et al. |
| 9,811,221 | B2 | 11/2017 | Hayashi |
| 9,847,505 | B2 | 12/2017 | Chida |
| 9,908,310 | B2 | 3/2018 | Niu |
| 9,917,282 | B2 | 3/2018 | Chida |
| 9,927,895 | B2 | 3/2018 | Ligtenberg |
| 10,067,628 | B2 | 9/2018 | Kuscher et al. |
| 10,098,198 | B2 | 10/2018 | Huebner et al. |
| 10,114,485 | B2 | 10/2018 | Su |
| 10,146,383 | B2 | 12/2018 | Leung et al. |
| 10,198,110 | B2 | 2/2019 | Suwald et al. |
| 10,241,255 | B2 | 3/2019 | Zha |
| 10,254,853 | B2 | 4/2019 | Silvanto et al. |
| 10,318,065 | B2 | 6/2019 | Peterson et al. |
| 10,409,412 | B1 | 9/2019 | Andre et al. |
| 10,656,719 | B2 | 5/2020 | Degner et al. |
| 10,732,676 | B2 | 8/2020 | Xu et al. |
| 10,795,451 | B2 | 10/2020 | Morrell et al. |
| 10,796,863 | B2 | 10/2020 | Stringer et al. |
| 10,871,860 | B1 | 12/2020 | Bushnell et al. |
| 10,963,117 | B2 | 3/2021 | Morrell et al. |
| 2004/0104894 | A1 | 6/2004 | Tsukada et al. |
| 2004/0257345 | A1 | 12/2004 | Makanae et al. |
| 2006/0109258 | A1 | 5/2006 | Takisawa |
| 2007/0076859 | A1 | 4/2007 | Tzvetanov |
| 2007/0236462 | A1 * | 10/2007 | Morris .................. H04M 1/23 345/169 |
| 2008/0018611 | A1 | 1/2008 | Serban et al. |
| 2008/0055259 | A1 | 3/2008 | Plocher et al. |
| 2008/0100568 | A1 | 5/2008 | Koch et al. |
| 2008/0150903 | A1 | 6/2008 | Chuang |
| 2008/0272927 | A1 | 11/2008 | Woolley et al. |
| 2009/0128495 | A1 | 5/2009 | Kong |
| 2009/0128496 | A1 * | 5/2009 | Huang .................. H01H 13/83 345/170 |
| 2009/0174663 | A1 * | 7/2009 | Rudd ................. G06F 3/04886 345/168 |
| 2009/0225052 | A1 | 9/2009 | Liu |
| 2009/0284465 | A1 | 11/2009 | Oki |
| 2010/0033354 | A1 | 2/2010 | Ejlersen |

(56) References Cited

U.S. PATENT DOCUMENTS

| | | | |
|---|---|---|---|
| 2010/0103116 A1* | 4/2010 | Leung | G06F 1/169 345/173 |
| 2010/0265183 A1* | 10/2010 | Mail | G06F 3/04895 345/168 |
| 2010/0271315 A1 | 10/2010 | Bathiche | |
| 2010/0271839 A1* | 10/2010 | Chan | H01H 13/83 362/602 |
| 2010/0283741 A1 | 11/2010 | Heintze et al. | |
| 2011/0001706 A1 | 1/2011 | Sanford | |
| 2011/0050620 A1* | 3/2011 | Hristov | G06F 3/0443 345/174 |
| 2011/0069021 A1 | 3/2011 | Hill | |
| 2011/0100568 A1 | 5/2011 | Kao et al. | |
| 2011/0234502 A1* | 9/2011 | Yun | G06F 3/04886 345/173 |
| 2011/0298716 A1* | 12/2011 | Mahowald | H01H 13/83 345/168 |
| 2012/0001852 A1 | 1/2012 | Ho et al. | |
| 2012/0050646 A1 | 3/2012 | Huang | |
| 2012/0068933 A1 | 3/2012 | Larsen | |
| 2012/0212443 A1 | 8/2012 | Tomimori | |
| 2013/0002534 A1 | 1/2013 | Braun et al. | |
| 2013/0002573 A1 | 1/2013 | Baba | |
| 2013/0021256 A1 | 1/2013 | Manzen | |
| 2013/0215122 A1 | 8/2013 | McCollum | |
| 2013/0335329 A1 | 12/2013 | Freund | |
| 2014/0015755 A1 | 1/2014 | Hao | |
| 2014/0043289 A1 | 2/2014 | Stern et al. | |
| 2014/0208262 A1 | 7/2014 | Huang | |
| 2014/0317564 A1 | 10/2014 | Odell et al. | |
| 2014/0340208 A1* | 11/2014 | Tan | H01H 13/83 340/407.2 |
| 2014/0347312 A1 | 11/2014 | Siska | |
| 2014/0368455 A1 | 12/2014 | Croisonnier et al. | |
| 2015/0123906 A1* | 5/2015 | Mehandjiysky | G06F 3/0213 345/168 |
| 2015/0123907 A1 | 5/2015 | Aoki | |
| 2015/0136573 A1* | 5/2015 | Peterson | H01H 13/88 200/314 |
| 2015/0205417 A1 | 7/2015 | Yairi et al. | |
| 2015/0223328 A1 | 8/2015 | Endoh et al. | |
| 2015/0293592 A1 | 10/2015 | Cheong et al. | |
| 2015/0297145 A1 | 10/2015 | Luna et al. | |
| 2015/0309589 A1 | 10/2015 | Chang | |
| 2016/0147440 A1 | 5/2016 | Leyon | |
| 2016/0231856 A1 | 8/2016 | Suwald et al. | |
| 2017/0090594 A1 | 3/2017 | Silvanto et al. | |
| 2017/0090596 A1 | 3/2017 | Silvanto et al. | |
| 2017/0090597 A1 | 3/2017 | Silvanto et al. | |
| 2017/0090654 A1 | 3/2017 | Silvanto et al. | |
| 2017/0249072 A1 | 8/2017 | Martin et al. | |
| 2017/0293387 A1* | 10/2017 | Zhang | G06F 3/044 |
| 2018/0011548 A1 | 1/2018 | Garelli | |
| 2018/0039351 A1 | 2/2018 | Zhu et al. | |
| 2018/0203521 A1* | 7/2018 | Wackers | G06F 3/0233 |
| 2019/0025954 A1 | 1/2019 | Wang et al. | |
| 2020/0257375 A1 | 8/2020 | Degner et al. | |
| 2020/0333853 A1 | 10/2020 | Xu et al. | |

FOREIGN PATENT DOCUMENTS

| | | |
|---|---|---|
| CN | 101482785 | 7/2009 |
| CN | 101609383 | 12/2009 |
| CN | 101644979 | 2/2010 |
| CN | 101675410 | 3/2010 |
| CN | 201563116 | 8/2010 |
| CN | 102171632 | 8/2011 |
| CN | 102200861 | 9/2011 |
| CN | 202166970 | 3/2012 |
| CN | 102844729 | 12/2012 |
| CN | 103164102 | 6/2013 |
| CN | 103176691 | 6/2013 |
| CN | 203260010 | 10/2013 |
| CN | 103384871 | 11/2013 |
| CN | 103425396 | 12/2013 |
| CN | 103455205 | 12/2013 |
| CN | 103577008 | 2/2014 |
| CN | 103914196 | 7/2014 |
| CN | 104423740 | 3/2015 |
| CN | 104834419 | 8/2015 |
| CN | 104915002 | 9/2015 |
| CN | 205038595 | 2/2016 |
| CN | 206147528 | 5/2017 |
| EP | 0189590 | 6/1986 |
| EP | 2305506 | 4/2011 |
| EP | 2664980 | 11/2013 |
| FR | 2980004 | 3/2013 |
| JP | 2001175415 | 6/2001 |
| TW | 200912612 | 3/2009 |
| TW | 201419112 | 5/2014 |
| WO | WO 07/032949 | 3/2007 |
| WO | WO 11/159519 | 12/2011 |
| WO | WO 14/124173 | 8/2014 |
| WO | WO 14/164628 | 10/2014 |

\* cited by examiner

CONFIGURABLE FORCE-SENSITIVE INPUT STRUCTURE FOR ELECTRONIC DEVICES

CROSS-REFERENCE TO RELATED APPLICATIONS

This application is a continuation of U.S. patent application Ser. No. 14/867,407, filed Sep. 28, 2015, entitled "Configurable Force-Sensitive Input Structure for Electronic Devices," which is a nonprovisional patent application of and claims the benefit of U.S. Provisional Patent Application No. 62/057,350, filed Sep. 30, 2014, entitled "Zero-Travel Input Structure," the disclosures of which are hereby incorporated herein by reference in their entirety. This application is also a nonprovisional patent application of and claims the benefit of U.S. Provisional Patent Application No. 62/057,425, filed Sep. 30, 2014, entitled "Dynamic Track Pad for Electronic Devices," the disclosure of which is hereby incorporated herein by reference in its entirety.

FIELD

The disclosure relates generally to electronic devices and, more particularly, to a configurable, force-sensitive input structure for an electronic device.

BACKGROUND

Conventional electronic devices typically include a variety of distinct input devices formed from a variety of components. For example, conventional laptop computing devices typically include a keyboard and a track pad to allow a user to interact with the laptop. Each of these devices includes a variety of components that may be positioned both inside and outside of the casing of the laptop. For example, the keyboard may include keycaps protruding from the casing, and corresponding internal dome switches, electrical contacts and traces positioned within the casing. In order for the keycaps to protrude from the casing and maintain contact with the internal components, keycap apertures are formed through the casing of the electronic device.

However, conventional input devices, such as keyboards or track pads for a laptop, are susceptible to damage. For example, debris and other contaminants may enter the casing of the electronic device through the keycap apertures and may subsequently damage the internal components of the electronic device. The damage to the internal components may render the electronic device inoperable. Likewise, the mechanical structures forming the input devices may be especially vulnerable to a drop or mechanical shock.

Additionally, because many conventional input devices have a number of components positioned both inside and outside the casing of the electronic device, the risk of component failure may increase. That is, in combination with some components being positioned on the outside of the casing where a number of components are used to form each of the conventional input devices, if a single component is damaged, lost, or becomes inoperable, the entire input device may become inoperable.

SUMMARY

An input structure is disclosed. The input structure comprises a metal contact layer defining a dimensionally-configurable input region, a sense layer positioned below the metal contact layer, a drive layer capacitively coupled to the sense layer, a compliant layer positioned between the sense layer and the drive layer, and a rigid base layer positioned below the drive layer, wherein the sense layer and drive layer cooperate to sense an force exerted on the metal contact layer.

An electronic device is also disclosed. The electronic device comprises a metal casing having a contact portion, and a base portion positioned below and coupled to the contact portion. The electronic device also includes a group of holes formed through the contact portion, and an input structure positioned within the casing and below the group of holes. The input structure includes a sense layer positioned below the contact portion of the metal casing, a drive layer positioned beneath the sense layer, a compliant layer positioned between and coupled to the sense layer and the drive layer, and a set of supports positioned within the compliant layer. The input structure may capacitively detect a force and a location of a force exerted on the contact portion of the metal casing.

An electronic device is disclosed. The electronic device comprises a metal casing comprising a partially-flexible contact portion, and an input structure positioned below and secured to the partially-flexible contact portion of the casing. The input structure comprises at least one input area formed on a portion of the partially-flexible contact portion. The input structure is configured to provide a group of interchangeable input devices within the at least one input area formed on at least the portion of the partially-flexible contact portion.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
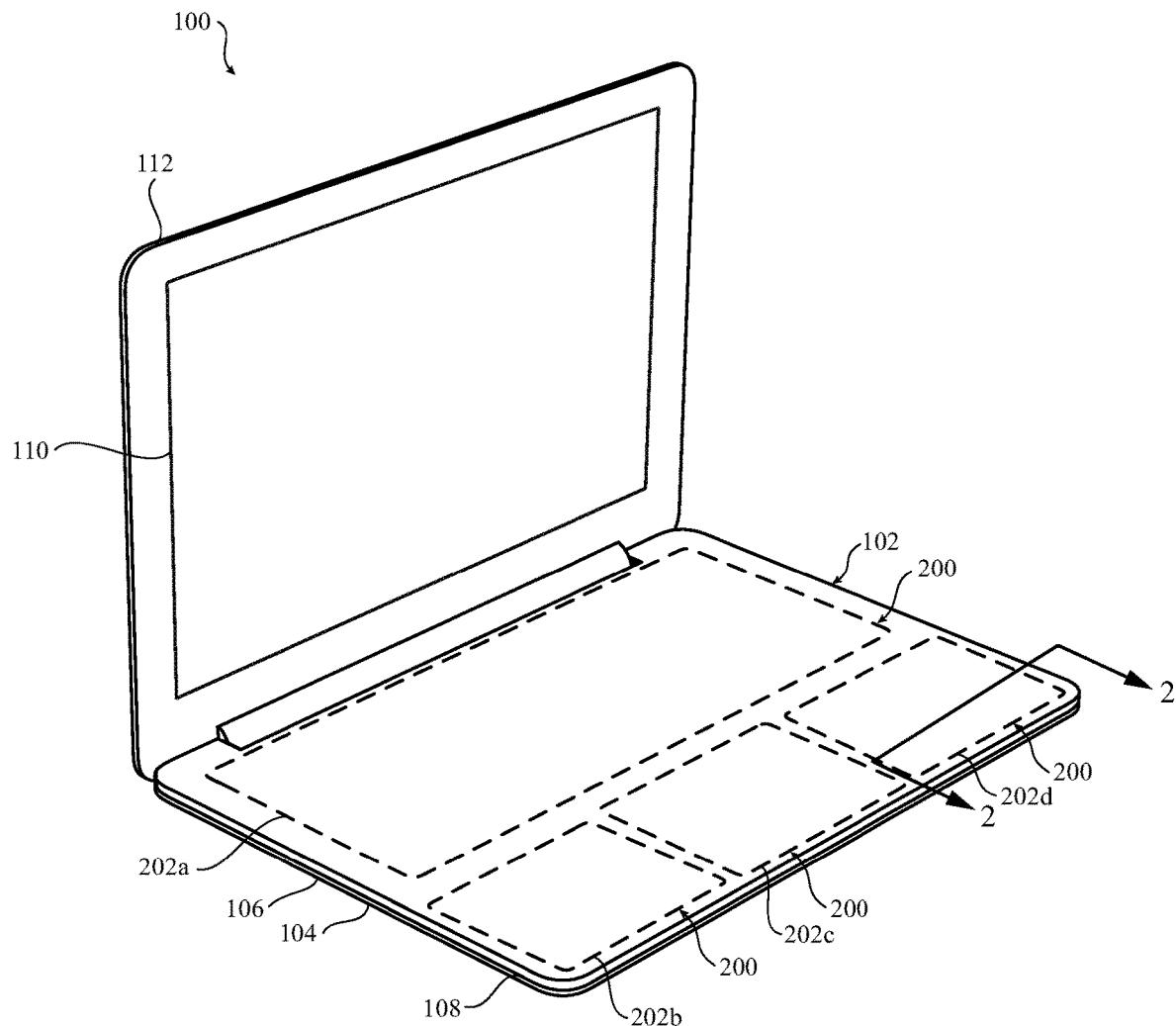
FIG. 1A shows an electronic device including a configurable, force-sensitive input structure, according to embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to electronic devices and, more particularly, to a configurable, force-sensitive input structure for an electronic device. In some embodiments, the force-sensitive input structure may be a zero travel or low travel structure.

The term "zero travel," as used herein, may not require the absence of movement, but rather may be defined as imperceptible or unrecognizable movement of components of the input structure by a user of the electronic device and/or a flexing or bending of a structure as opposed to travel of one component with respect to another. As discussed herein, components of the electronic device and/or the input structure may deform in response to a user force providing an input to the electronic device (e.g., an "input force"). However, the deformation of these components may not be perceived, felt or detected by the user when interacting with the electronic device and/or the input structure, or may be relatively negligible.

In a particular embodiment, the configurable, force-sensitive input structure may be configured as a variety of input devices for the electronic device including, but not limited to, a keyboard, a number pad or a track pad. The electronic device may utilize a single input structure for forming a number of distinct input devices, or, conversely, may include a number of input structures for forming distinct input devices. The electronic device may include a contact portion formed from a flexible (or partially-flexible) material that may bend or deform into and/or to contact a portion of an input stack-up. For example, the contact portion may be a metal sheet or part of a metal housing of an electronic device. The input stack-up may capacitively sense the deformation of the contact portion due to application of an input force on a corresponding contact portion of the electronic device. Typical input forces may be approximately 20-350 grams, in certain embodiments, although this range is meant merely as an example rather than a limitation. The input force applied to the contact portion is of sufficient magnitude to result in deformation of the contact portion into the stack-up such that the stack-up capacitively senses the force. In some embodiments the force is such that resultant bending or deformation of the contact portion is visually and/or tactilely imperceptible to a user.

When an input force is applied and the detected capacitance exceeds a threshold, an input corresponding to any or all of the location of the capacitance change, amount of capacitive change, and/or deformation of the contact portion may be provided to the electronic device. The location of a capacitive change may correspond to a location on a surface of the electronic device at which the input force was provided, and thus to a touch location. Accordingly, embodiments herein may detect not only a continuum of forces (as opposed to binary detection of force) but also a location of touch/interaction. Further, because embodiments described herein do not rely on capacitive coupling between a sensor and a device or person providing a touch input, embodiments may sense force and/or touch through grounding and/or shielding structures, such as metal, and may sense inputs provided by non-capacitive constructs touching an electronic device.

Additionally, because the configurable, force-sensitive input structure may form a variety of distinct input devices, the contact layer may be configured to include one or more input areas, which include distinct input devices having distinct functions for the electronic device.

As discussed herein, the force-sensitive input structure is configurable and may take the form or shape of multiple, distinct input devices or components for the electronic device. As a result, the force-sensitive input structure can provide unique/configurable input devices or components to a user; such devices/components may not be typically associated with the electronic device and/or may not be usually integrated with the electronic device.

Furthermore, positioning of the input devices of the force-sensitive input structure may be customizable. That is, the input devices can be moved to distinct locations on the casing, within the force-sensitive input structure. As a result, the input devices can be moved to a specific location of the casing based on user preference. Similarly, one or more of such input devices may be resized or reshaped by user input, operation of an associated electronic device, software, firmware, other hardware, and so on. Thus, the input structure may be said to be dimensionally configurable insofar as input devices (or regions) on its surface may be moved and/or resized and/or reshaped.

Additionally, and as discussed herein, the components or layers forming the force-sensitive input structure are substantially surrounded by and/or enclosed within the casing of the electronic device. As a result, no portion of the force-sensitive input structure is exposed, except a contact surface. As a result, the casing can be formed from a solid piece of material, which may prevent damage to the internal components of the electronic device and/or the components of the force-sensitive input structure.

These and other embodiments are discussed below with reference to FIGS. 1A-15B. However, those skilled in the art will readily appreciate that the detailed description given herein with respect to these figures is for explanatory purposes only and should not be construed as limiting.

Figure 1B:
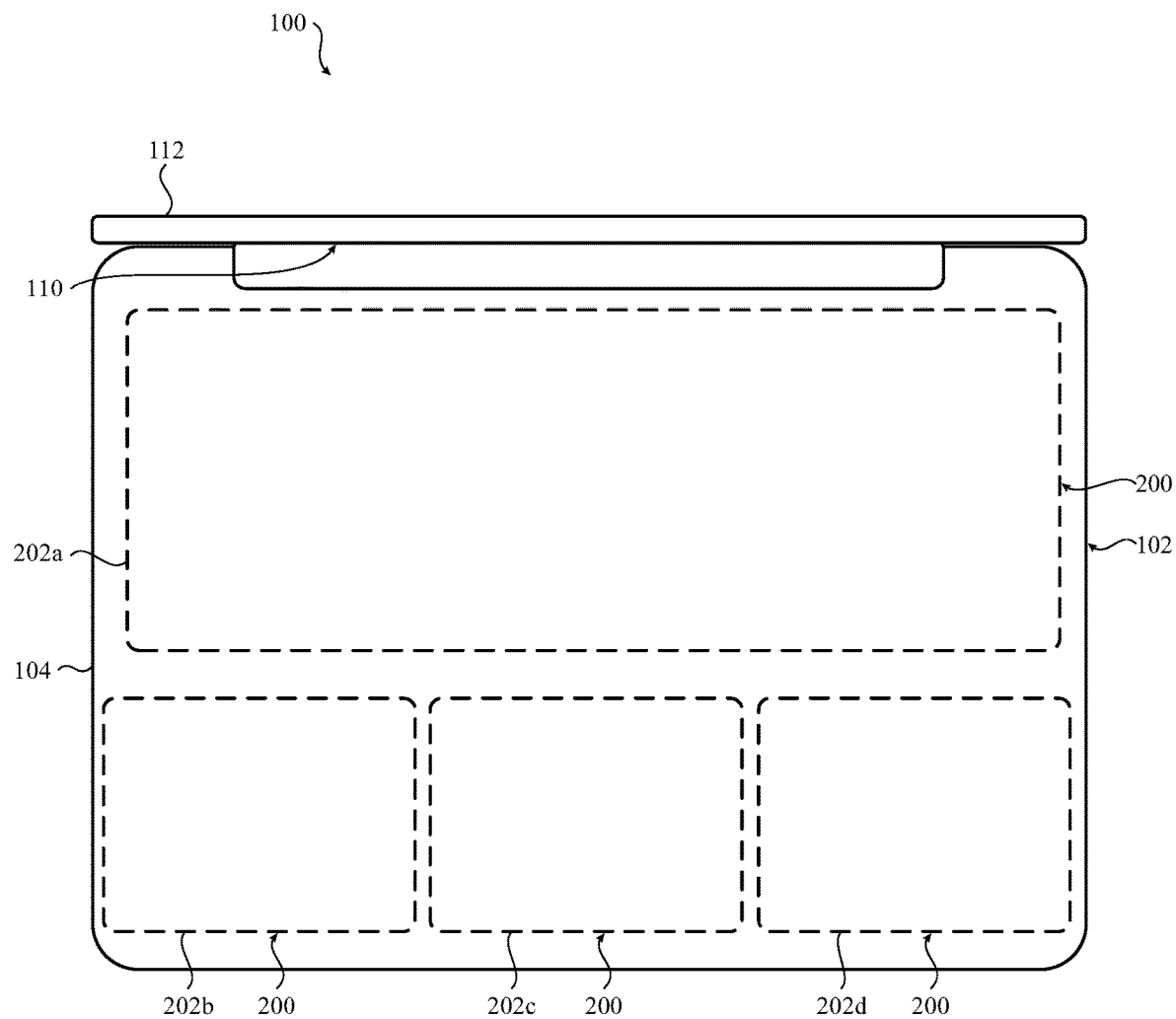
FIG. 1B shows a top view of the electronic device of FIG. 1A, according to embodiments.

FIGS. 1A and 1B show an electronic device 100, including a configurable, force-sensing input structure 200, according to embodiments. In a non-limiting example, as shown in FIGS. 1A and 1B, electronic device 100 may be a laptop computer. However, it is understood that electronic device 100 may be configured as any suitable electronic device that may utilize configurable, force-sensitive input structure 200 (hereafter, "input structure 200").

As discussed herein, force-sensing input structure 200 is formed within a casing of electronic device 100, and specifically, below a contact portion of the casing of the electronic device 100 in order for a user of electronic device 100 to interact and/or utilize input structure 200. Force-sensitive input structure 200 is a configurable structure that may take the form or shape of multiple, distinct input devices or components for electronic device 100. As a result, input structure 200 of electronic device 100 provides unique input devices or components to a user of electronic device 100 that may not be typically associated with electronic device 100 and/or require additional, auxiliary components that are "add-ons" and/or are not integral with electronic device 100. In a non-limiting example, and by comparison to a conventional a laptop which may only include a standard "QWERTY" keyboard and a track pad, electronic device 100 having force-sensitive input structure 200 can include a QWERTY keyboard, a track pad, a standalone numeric keypad, a special characters or glyph keypad, and/or enlarged directional keys portion.

Furthermore, because force-sensitive input structure 200 can be configured as a variety of input devices or components, and may be switched between various input devices or components, the positioning of the input devices formed by force-sensitive input structure 200 may be customizable within electronic device 100. That is, where force-sensitive input structure 200 is formed below a portion or substantially the entire contact portion of the casing of electronic device 100, the positioning of the input devices formed by force-sensitive input structure 200 can be moved on the contact surface. As a result, track pads can be moved to a specific side of the contact portion of the casing or can be placed above a keyboard formed by force-sensitive input structure 200 when a user is utilizing electronic device 100 to primarily type using the keyboard. Likewise, the size and/or shape of a region of the input structure 200 may be configured by a user. For example, a user may specify a particular area, region or the like to accept input. In other words, the input structure may be dimensionally configurable.

Additionally, and as discussed herein, the components or layers forming force-sensitive input structure 200 are substantially surrounded by and/or enclosed within the casing of electronic device 100. As a result, no portion of force-sensitive input structure 200 is exposed and/or positioned between the external and internal portion of the casing forming electronic device 100. As a result, the contact portion of the casing which is interacted with to utilize force-sensitive input structure 200 can be formed from a solid piece of material and/or may not have any holes, recess or ingresses within the internal portion of the casing of electronic device 100. The solid casing may prevent damage to the components of electronic device 100 and/or the components of force-sensitive input structure 200 caused by direct exposure to shock events (e.g., drops) and/or exposure to environmental or external contaminants (e.g., dust, water, and so on).

In many embodiments, the force-sensitive input structure may be a zero travel input structure. As discussed above, the term "zero travel" used herein, may not be related to the absence of movement, but rather, may more accurately defined as imperceptible or unrecognizable movement of components of input structure 200 by a user of electronic device 100. As discussed herein, components of electronic device 100 and/or input structure 200 may deform to provide an input to electronic device 100. However, the deformation of these components may not be perceived, felt or detected by the user when interacting with electronic device 100 and/or input structure 200.

Electronic device 100 may include a casing 102. Casing 102 may take the form of an exterior, protective casing or shell for electronic device 100 and the various internal components (for example, input structure 200) of electronic device 100. Casing 102 may be formed as distinct components that may be configured to be coupled to one another. In a non-limiting example, as shown in FIGS. 1A and 1B, casing 102 may be formed from a contact layer or portion 104, and a base layer or portion 106 coupled to contact portion 104. Contact layer or portion 104 and base layer or portion 106 may be coupled to one another along a seam line 108 of electronic device 100. As discussed herein, contact portion 104 including input structure 200 may be interacted with (e.g., touched) by a user for providing input and/or interacting with electronic device 100. Base portion 106 may provide structural support to input structure 200 and electronic device 100, as discussed herein. Contact layer or portion 104 may extend across only a part of a casing or may extend across all of a casing. For example, contact layer or portion 104 may extend across part of a single surface of the casing 102, or may extend across all of a surface, or may extend across multiple surfaces. Further, a single device (and/or a single casing) may have multiple contact portions 104.

Contact layer 104 and base layer 106 may be formed from any suitable material that provides a protective casing or shell for electronic device 100 and the various components included in electronic device 100. Additionally, contact layer 104 and base layer 106 of casing 102 may be formed from distinct materials or the same material having distinct physical dimensions and/or characteristics to aid in the function of each portion of casing 102. In a non-limiting example, contact layer 104 may be made from metal, such as an aluminum plate, housing (e.g., casing) or the like. In another non-limiting example, contact layer 104 may be formed from a ceramic, a plastic or another polymer, or a fiber-matrix composite, and so on. The contact layer 104 may be at least partially flexible when pressed by a user. However, the contact layer may flex imperceptibly from a user's standpoint when a typical input force is exerted on the contact layer (e.g., experience zero travel). In some embodiments, the contact portion may move, flex or travel on the order of tens of microns or less under typical input forces, all of which are encompassed by the term "zero travel"). For example, the contact layer 104 may travel 100 microns or less under a typical input force, or 50 microns or less, or 10 microns or less. Other embodiments may permit greater travel, and may permit user-perceptible travel.

Base layer 106 may be made from a similar or distinct material from contact portion 104. In a non-limiting example, base portion 106 may be formed from metal such as aluminum or any other suitable metal, a ceramic, a plastic or another polymer, a fiber-matrix composite, or any other suitable material that may be substantially rigid in order to support electronic device 100 and input structure 200, as discussed herein. Base layer or portion 106 may also act as a ground and/or shield for one or both of a sense layer and a drive layer, as described herein.

As shown in FIGS. 1A and 1B, electronic device 100 may also include a display 110 and a display case 112 housing display 110. Display case 112 may form an exterior housing and/or protective enclosure for display 110 of electronic device 100 as similarly discussed herein with respect to casing 102. Display 110 may be implemented as any suitable display technology utilized by electronic device 100.

Input structure 200 may be formed and/or positioned on or within electronic device 100. As discussed herein, the various electrically communicative components or layers, commonly referred to as a "stack-up," forming input structure 200 may be positioned between and or secured to at least one of the contact portion 104 and/or the base portion 106 of casing 102 of electronic device 100. Input structure 200 may provide or form a number of input areas 202a, 202b, 202c, 202d (shown in phantom) on contact portion 104 of electronic device 100, as shown in FIGS. 1A and 1B. The input areas 202a, 202b, 202c, 202d are predetermined areas of contact portion 104 that allow a user to interact and/or provide input to electronic device 100.

Although four distinct input areas 202a, 202b, 202c, 202d are shown in FIGS. 1A and 1B, electronic device 100 may have any number of input areas defined on contact portion 104. In a non-limiting example, contact portion 104 of electronic device 100 may include a single input area that may be formed over at least a portion of contact portion 104 (see, FIGS. 13A and 13B). In another non-limiting example, contact portion 104 of electronic device 100 may include two equally sized input areas formed over at least a portion of contact portion 104. Further, input areas may be formed on other portions of the housing (e.g., casing), such as an exterior of the housing, side of the housing, in the display case 112, and so on.

Additionally, and discussed in detail below, each of the input areas 202a, 202b, 202c, 202d on contact portion 104 may be formed from a stack-up as described below; each input area may have its own stack-up or multiple input areas may share a stack-up. In a non-limiting example, electronic device 100 may have distinct stack-ups for each input area 202a, 202b, 202c, 202d on contact portion 104 of electronic device 100. In another non-limiting example, electronic device 100 may have a single stack-up for all input areas 202a, 202b, 202c, 202d on contact portion 104 of electronic device 100. In the non-limiting example having a single stack-up, portions of contact portion 104 of electronic device 100 not within or defining an input area may correspond to portions of the stack-up that are electrically insulated and/or otherwise not configured to provide electrical input in response to a user's action.

Although electronic device 100 is shown as a laptop computer, it is understood that electronic device 100 may be configured as any suitable electronic device that may utilize input structure 200. In non-limiting examples, other embodiments can implement electronic device 100 differently, such as, for example, a desktop computer, a tablet computing device, a smartphone, a gaming device, a display, a digital music player, a wearable computing device or display, a health monitoring device, and so on.

Additionally, although discussed herein as an input structure, it is understood that the disclosed embodiments may be used in a variety of input devices utilized in various electronic devices. As discussed herein, input structure 200, and the components of the structure, may be utilized or implemented in a variety of input devices for an electronic device including, but not limited to, buttons, switches, toggles, wheels, mice, joystick, trackpads, and so on.

Figure 2:
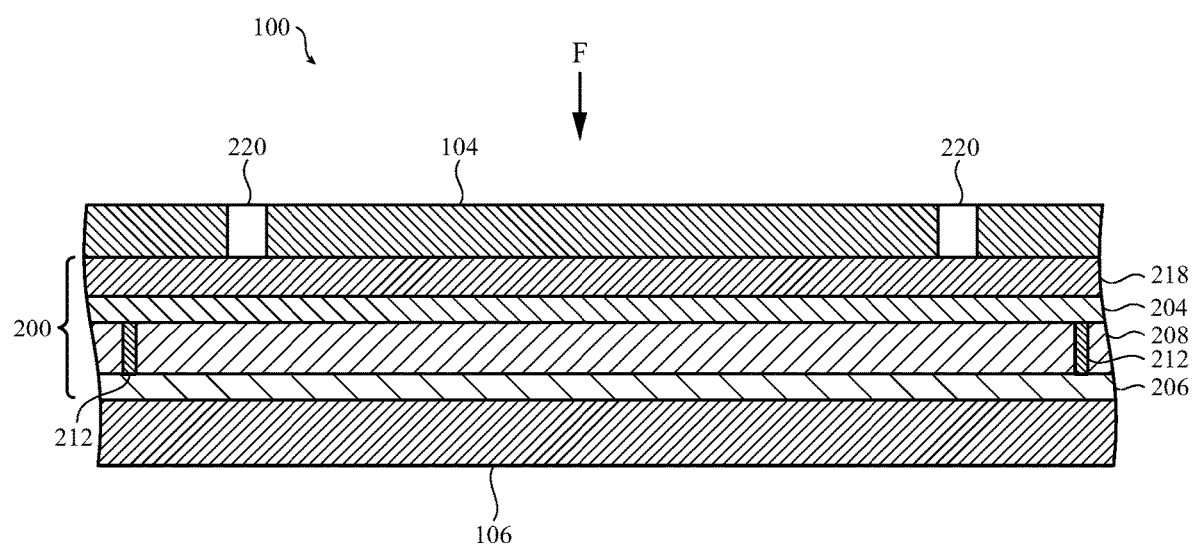
FIG. 2 shows a cross-section side view of a stack-up of a force-sensitive input structure of the electronic device of FIG. 1A, taken along line 2-2, according to embodiments. The force-sensitive input structure includes a compliant layer formed therein.
Figure 3:
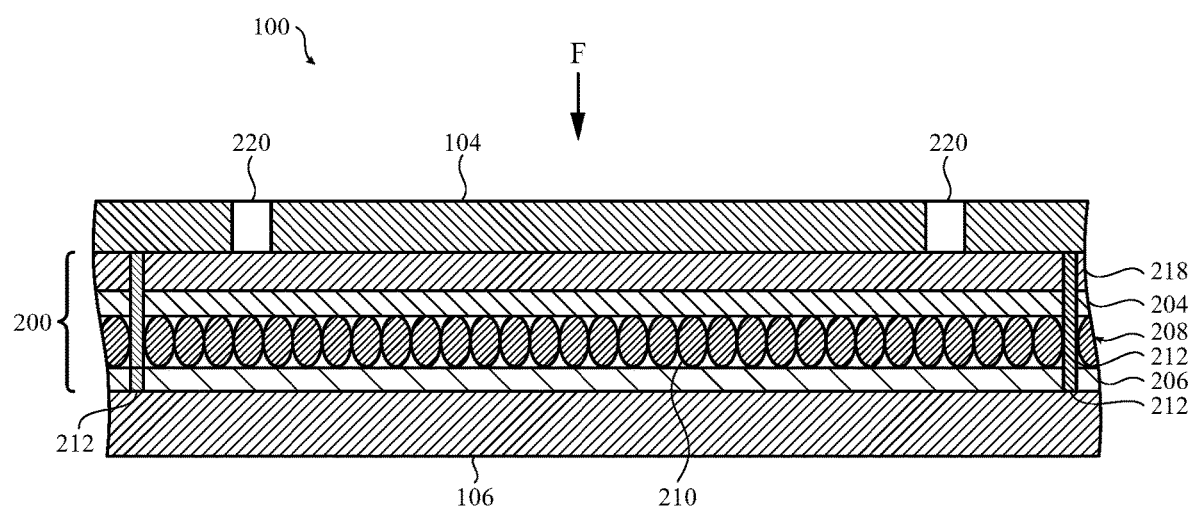
FIG. 3 shows a cross-section side view of a stack-up of a force-sensitive input structure of the electronic device of FIG. 1A, taken along line 2-2, according to additional embodiments. The force-sensitive input structure includes deformable compliant supports formed therein.

FIGS. 2 and 3 show a side cross-section view of a portion of electronic device 100, taken along line 2-2 in FIG. 1A. As shown in FIG. 2, and discussed herein, various electrically communicative components or layers (e.g., stack-up) forming input structure 200 may be positioned between contact portion 104 and base portion 106 of casing 102 for electronic device 100. The stack-up of input structure 200 may include a sense layer 204, and a corresponding drive layer 206 separated from sense layer 204. As shown in FIGS. 2 and 3, sense layer 204 may be positioned below contact portion 104, and drive layer 206 may positioned adjacent and/or above base portion 106 of electronic device 100. It should be appreciated that the position of sense layer 204 and drive layer 206 may be interchanged in certain embodiments. In a non-limiting example, sense layer 204 can be positioned above or adjacent base portion 106 and drive layer 206 can be positioned adjacent and/or below contact portion 104.

Sense layer 204 and drive layer 206 of input structure 200 may cooperate to measure capacitance between the sense layer 204 and drive layer 206, and particularly capacitances (and changes in capacitances) at specific areas where the sense layer 204 and drive layer 206 overlap. The capacitive characteristics of sense layer 204 and drive layer 206 may be utilized to detect deflection in contact portion 104 when a force (F) is applied by a user of electronic device 100. As discussed herein, the force (F) may be applied to contact portion 104 of electronic device 100 in an input area 202 for a user to provide input to and/or to interact with electronic device 100. Since sense layer 204 and drive layer 206 can determine input based on measured changes in capacitance, the force applied to contact portion 104 can come from any user or object. Input structure 200 does not require the user to directly touch the input structure. Rather, the user can apply the force to contact portion 104 using any object.

As shown in FIGS. 2 and 3, a compliant layer 208 may be positioned between sense layer 204 and drive layer 206 of stack-up of input structure 200. Compliant layer 208 may also be physically coupled to each or both of sense layer 204 and drive layer 206. Compliant layer 208 may be coupled to sense layer 204 and drive layer 206 using any suitable adhesive.

Compliant layer 208 may be formed from a substantially flexible and elastic material to support sense layer 204, and/or prevent sense layer 204 from contacting drive layer 206 when force is applied to contact portion 104 of electronic device 100. Additionally, the elastic properties of compliant layer 208 may allow sense layer 204 to return to a neutral state (e.g., spring-back to an uncompressed position) relatively rapidly, thereby permitting the detection of a consecutively-applied forces being applied at or near the same position on contact portion 104 and/or input area 202. Compliant layer 208 can have apertures formed therein or can be a set of structures such as columns or pillars, in order to provide space for compliant layer 208 to expand when deformed by a force. Alternatively, compliant layer 208 can be a solid, continuous layer(s) of material with no apertures, as discussed herein.

In a non-limiting example, and as shown in FIG. 2, compliant layer 208 may be formed from a single sheet of elastomeric material that may be disposed between sense layer 204 and drive layer 206. The elastomer forming compliant layer 208 may be any suitable material that may deform, and subsequently spring-back, as sense layer 204 (or a discrete portion thereof) is compressed toward drive layer 206 as a result of a force (F) applied to, and subsequently removed from, contact portion 104. The elastomer may be a compliant gel, for example.

In another non-limiting example, as shown in FIG. 3, compliant layer 208 may be formed from an array of deformable components, such as deformable compliant structures 210. For convenience, the term "gel dots" is used herein to describe the compliant structures, but this term is not meant to limit the structures to any particular material or shape. Deformable gel dots 210 may be formed from similar material as discussed herein with respect to compliant layer 208 in FIG. 2, and may have any suitable shape, size or configuration; in certain embodiments, the dots are cylindrical and form pillar-like structures extending between the drive and sense layers. As such, deformable gel dots 210 may also include similar structurally supportive characteristics and/or elastic characteristics as compliant layer 208. The array of deformable gel dots 210 may be individual components that may be bonded, laminated or otherwise coupled to form a single layer of deformable gel dots 210. Although shown and discussed herein as gel dots, it is understood that array of individual components forming compliant layer 208 can be any shape, any material having distinct consistencies and/or viscosities, so long as the array of individual components forming compliant layer 208 function in a substantially similar manner as gel dots 210 discussed herein.

The inclusion of the array of deformable gel dots 210 in the non-limiting example of FIG. 3 may aid in detecting the force (F) applied to contact portion 104 of electronic device 100. In a non-limiting example, where compliant layer 208 includes an array of deformable gel dots 210, the force (F) may be more localized or focused on those gel dots 210 aligned with the force (F) (e.g., under or nearby the portion of the contact portion 104 to which the force is applied). In the non-limiting example, gel dots 210 not under or otherwise aligned with the force (F) may not be deformed. Additionally, the deformable gel dots 210 may not disperse or otherwise spread the force (F) out over surrounding segments of the compliant layer 208. This may increase the accuracy and/or response-time of the force (F) being applied to contact portion 104 of electronic device 100 by a user because only a select group of deformable gel dots 210 may experience the force (F) and deform as a result.

The stack-up may also have a set of supports 212 (e.g., one or more supports 212) positioned between contact portion 104 and base portion 106 of electronic device 100. As shown in FIGS. 2 and 3, at least a portion of each of the supports 212 may be positioned within compliant layer 208. Additionally, the supports 212 may be distributed throughout contact portion 104 of electronic device 100 for providing structural support to contact portion 104. In a non-limiting example, the supports 212 may be positioned throughout electronic device 100 to provide structural support to contact portion 104 to substantially prevent or minimize undesirable bend or flex in contact portion 104 when a force (F) is not applied by a user, or to reduce bend or flex (e.g., travel) under user-applied force. Areas of contact portion 104 above and/or near supports 212 may be unbendable by a user, and therefore may be "dead zones" when no input can be detected by input structure 200. The set of supports 212 may be formed from any suitable material that may support contact portion 104. In a non-limiting example, the supports 212 may be formed from a polymer, such as plastic, or a metal. In either example, the supports may be a material similar to and/or formed integrally with contact portion 104 and/or base portion 106 of casing 102.

In a non-limiting example shown in FIG. 2, the set of the supports 212 may be positioned within compliant layer 208, between sense layer 204 and drive layer 206. As shown in FIG. 2, the set of supports 212 may contact each of the sense layer 204 and drive layer 206, adjacent compliant layer 208, or may extend through both to the base and contact portion. In the non-limiting example, the set of supports 212 may provide support to contact portion 104 through sense layer 204. That is, the supports 212 may resist deformation of the contact portion 104 (at least within a localized region of each support) and prevent the contact region (e.g., contact portion) from flexing or bending beyond a certain point. In some embodiments, the supports may thus limit motion of the contact region such that its motion is imperceptible to a user exerting a force on the contact region, so long as that force is insufficient to permanently warp or deform the contact region. In other words, the contact region may be a zero travel region, at least locally near the supports. In some embodiments, the contact region may be a zero travel region (and/or the input structure may be a zero travel structure) across all or substantially all of the region (or structure). In still other embodiments, the supports may be formed only outside of a contact region, such that they do not interfere with force sensing in any part of the contact region but still provide sufficient support to render the contact region zero travel.

In another non-limiting example as shown in FIG. 3, the supports 212 may be positioned within compliant layer 208 between contact portion 104 and base portion 106 of electronic device 100. As shown in FIG. 3, the set of supports 212 may contact both the contact portion 104 and base portion 106 of electronic device 100. Additionally, each support 212 may be formed within and/or positioned through compliant layer 208, sense layer 204 and drive layer 206. The supports 212 may be formed within the contact portion 104, outside the contact portion, or both inside and outside the contact portion.

As shown in FIGS. 2 and 3, stack-up of input structure 200 may also include a light guide layer 218 positioned between sense layer 204 and contact portion 104 of casing 102 of electronic device 100. Light guide layer 218 may be positioned between sense layer 204 and contact portion 104 to provide light to contact portion 104. In a non-limiting example shown in FIGS. 2 and 3, light guide layer 218 may be utilized to provide light to a group of micro-perforations or holes 220 formed through contact portion 104 of electronic device 100. In some embodiments, holes 220 may be sealed with an optically clear sealant (or any other suitable sealant) to reduce ingress of debris and/or liquid, while allowing light to pass through holes 220. As discussed in more detail below with respect to FIGS. 10-12, holes 220 may be formed throughout input areas 202, and may be utilized, along with light guide layer 218, to form, provide and/or display key boundaries, input device boundaries and/or key glyphs.

Although shown in a specific configuration in FIGS. 2 and 3, it is understood that the stack-up forming input structure 200 may be formed in different orders or orientations. In a non-limiting example, sense layer 204 and drive layer 206 may be flipped or switched within the stack-up. In another non-limiting example, light guide layer 218 may be positioned adjacent base portion 106. In the non-limiting example where light guide layer 218 is positioned adjacent base portion 106, the remaining layers in the stack-up (for example, the compliant layer 208) may be formed from a material having substantially transparent properties and/or characteristics to allow light to pass through the stack-up of input structure 200.

In a further non-limiting example embodiment, base portion 106 may be formed as a distinct layer in the stack-up for input structure 200, and not as a part of casing 102 of electronic device 100. In the non-limiting example, base portion 106 may be another distinct layer in the stack-up and may be formed from a substantially stiff material, for example steel.

Figure 4:
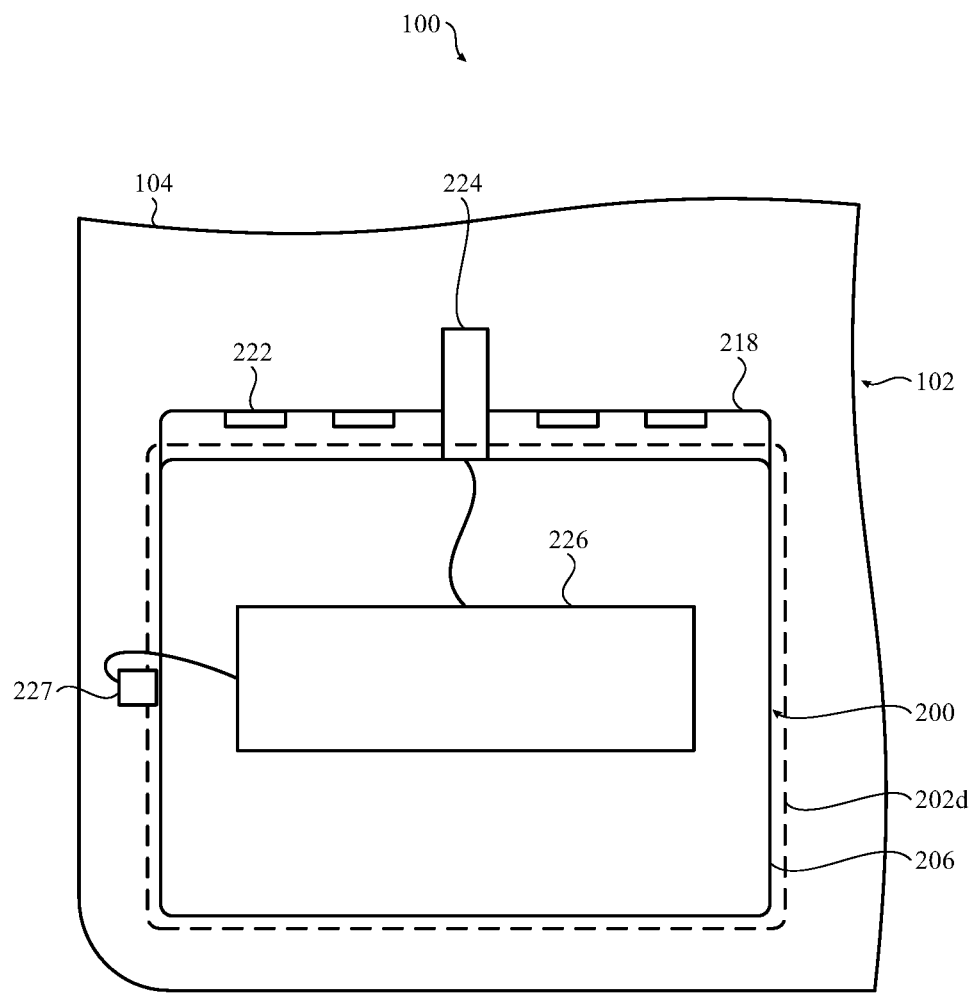
FIG. 4 shows a bottom view of a portion of an electronic device including a configurable, force-sensitive input structure and a haptic feedback module, according to embodiments.

FIG. 4 shows a bottom view of portion of electronic device 100 and input structure 200. Base portion 106 of electronic device 100 is removed in FIG. 4 to more clearly show input structure 200. As shown in FIG. 4, light guide layer 218 may extend beyond the other layers of stack-up of input structure 200, for example, drive layer 206. Further, one or more light sources 222 may be positioned on, near, or adjacent light guide layer 218. Light source 222 may be any suitable light source, such as an LED, that may emit light into light guide layer 218, which may subsequently direct the light through holes 220 of contact portion 104 to light portions of input area 202d, as discussed herein.

As shown in FIG. 4, stack-up of input structure 200 may also include a circuit connector 224 in electrical communication with various layers of input structure 200. Circuit connector 224 may be in electrical communication with sense layer 204 and drive layer 206 for detecting and/or determining a capacitance change in input structure 200 when a force is applied to contact portion 104 of electronic device 100. Circuit connector 224 may be configured as any suitable electrically communicative conduit or line including, but not limited to an electrical flex or an electrical trace.

Additionally, circuit connector 224 may be in electrical communication with various distinct components of electronic device 100. In a non-limiting example shown in FIG. 4, circuit connector 224 may be in electrical communication with a haptic feedback module 226 of electronic device 100. In the non-limiting example, circuit connector 224 may electrically couple haptic feedback module 226 to stack-up of input structure 200. As shown in FIG. 4, haptic feedback module 226 may be positioned on or aligned with stack-up forming input structure 200 where base portion 106 is formed from a distinct layer as discussed herein. Haptic feedback module 226 may also be in communication with haptic actuator(s) 227 (one shown) positioned at least partially within or adjacent to input area 202d. The haptic feedback module 226, via haptic actuator(s) 227, may provide haptic signals to contact portion 104 of casing 102 including input area 202d. As discussed herein, because there is no button for providing haptic feedback to a user of input structure 200, haptic feedback module 226 may recognize a user's input by communicating with stack-up of input structure 200, and may subsequently provide a haptic feedback through haptic signals (e.g., ultrasonic waves), generated by haptic actuator 227, to the user. The haptic signals mimic the tactile feel of depressing a button on a conventional keyboard, or a click on a conventional track pad, as discussed herein.

Figure 5:
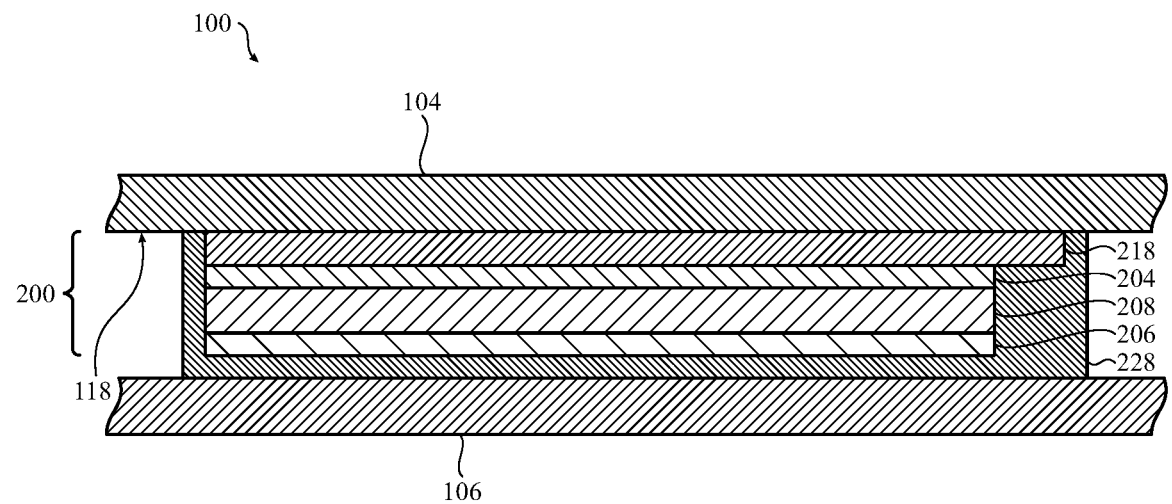
FIG. 5 shows a cross-section side view of a portion of a stack-up of a force-sensitive input structure of the electronic device of FIG. 1A, taken along line 2-2, according to embodiments. The stack-up of the force-sensitive input structure is secured within the electronic device in a first configuration, as shown in FIG. 5.
Figure 6:
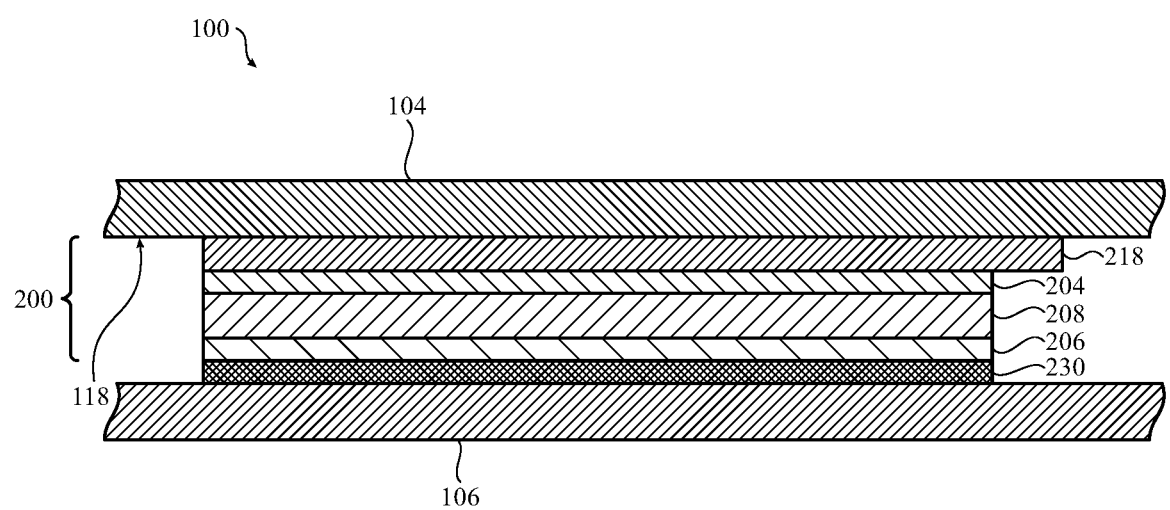
FIG. 6 shows a cross-section side view of a portion of a stack-up of a force-sensitive input structure of the electronic device of FIG. 1A, taken along line 2-2, according to additional embodiments. The stack-up of the force-sensitive input is secured within the electronic device in a second configuration, as shown in FIG. 6.
Figure 7:
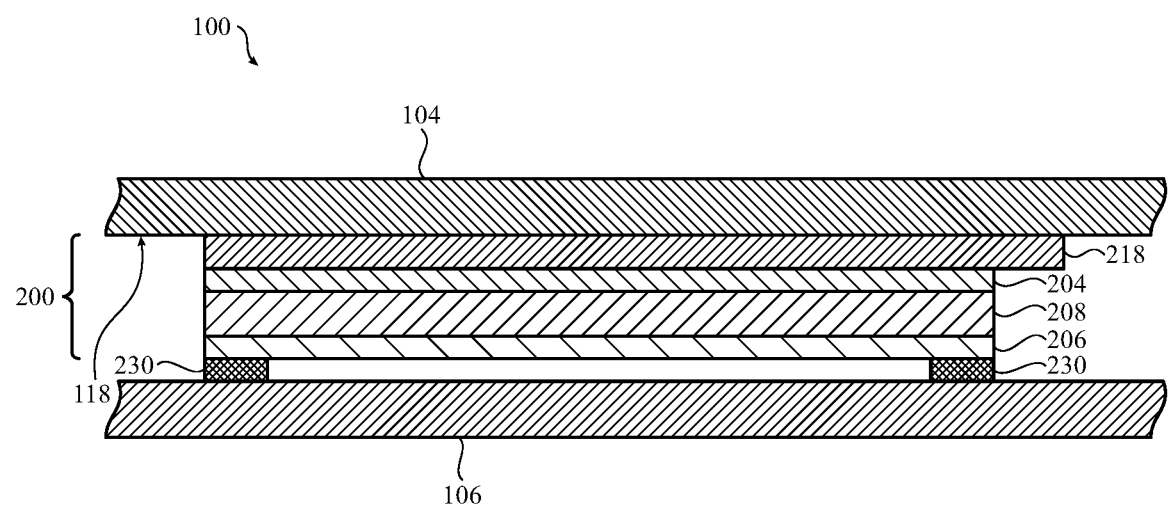
FIG. 7 shows a cross-section side view of a portion of a stack-up of a force-sensitive input structure of the electronic device of FIG. 1A, taken along line 2-2, according to further embodiments. The stack-up of the force-sensitive input structure is secured within the electronic device in a third configuration, as shown in FIG. 7.

FIGS. 5-7 show non-limiting examples of the stack-up of input structure 200 being secured and/or coupled within casing 102 of electronic device 100. In the non-limiting example shown in FIG. 5, stack-up of input structure 200 may be affixed and/or laminated directly to an interior surface 118 of contact portion 104 of casing 102. The laminating may occur after the various layers of stack-up of input structure 200 are coupled together, and input structure 200 is positioned on interior surface 118. A laminate material 228 may be disposed over stack-up of input structure 200 and a portion of interior surface 118 of contact portion 104. To ensure a desired bond, and to maintain a desired bond over the operational life of electronic device 100, in some embodiments laminate material 228 may completely cover stack-up of input structure 200 and cover a portion of interior surface 118 of contact portion 104 surrounding input structure 200. In the example embodiment of FIG. 5, input structure 200 may be suspended within casing 102 of electronic device. As a result, input structure 200 may be primarily supported by the laminate material 228, laminating input structure to contact portion 104. Input structure 200 may be secondarily supported by base portion 106, positioned adjacent to drive layer 206.

In the example embodiments in FIGS. 6 and 7, drive layer 206 may be primarily responsible for securing input structure 200 within casing 102 of electronic device 100. In the example embodiments, and as discussed herein, the various layers forming stack-up of input structure 200 may be coupled to one another using an adhesive, such that stack-up of input structure 200 is a single structure formed from multiple bonded layers or components. In the example embodiment as shown in FIG. 6, drive layer 206 of input structure 200 may extend over and be coupled to an entire surface of base portion 106 of electronic device 100. Adhesive 230 may be used to couple drive layer 206 to base portion 106. Distinct from the example in FIG. 5, in the example shown in FIG. 6, stack-up of input structure 200 may only be supported by base portion 106 of casing 102 of electronic device 100. Additionally, by coupling an entire drive layer 206 to a surface of base portion 106, the rigid material of base portion 106 may support stack-up of input structure 200. Although shown in FIG. 6 as extending over the entire surface of base portion 106, it is understood that drive layer 206 may extend over and/or cover only a portion of base portion 106.

In non-limiting example shown in FIG. 7, drive layer 206 of input structure 200 may be disposed over and coupled to a portion of base portion 106 of electronic device 100. Drive layer 206, as shown in FIG. 7, may be coupled to base portion 106 of electronic device 100 at each corner of drive layer 206. Adhesive 230 may be used to couple drive layer 206 to base portion 106. Similar to FIG. 6, in the example shown in FIG. 7, stack-up of input structure 200 may be supported by base portion 106 of casing 102 of electronic device 100. By coupling drive layer 206 to base portion 106 only at the corners of drive layer 206, the material used for coupling input structure 200 within casing 102 may be reduced. Additionally, by coupling drive layer 206 to base portion 106 only at the corners of drive layer 206, sense layer 204 and compliant layer 208 may have increased deflection when a user provides an input to electronic device 100 by applying a force. The increase deflection may ensure electronic device 100 receives the input provided by the user. Although shown in FIG. 7 as utilizing adhesive 230 to couple drive layer 206 to base portion 106, it is understood that other suitable coupling and/or bonding components may be used. In non-limiting examples, drive layer 206 may be coupled to base portion 106 using tape, lamination and so on.

Figure 8:
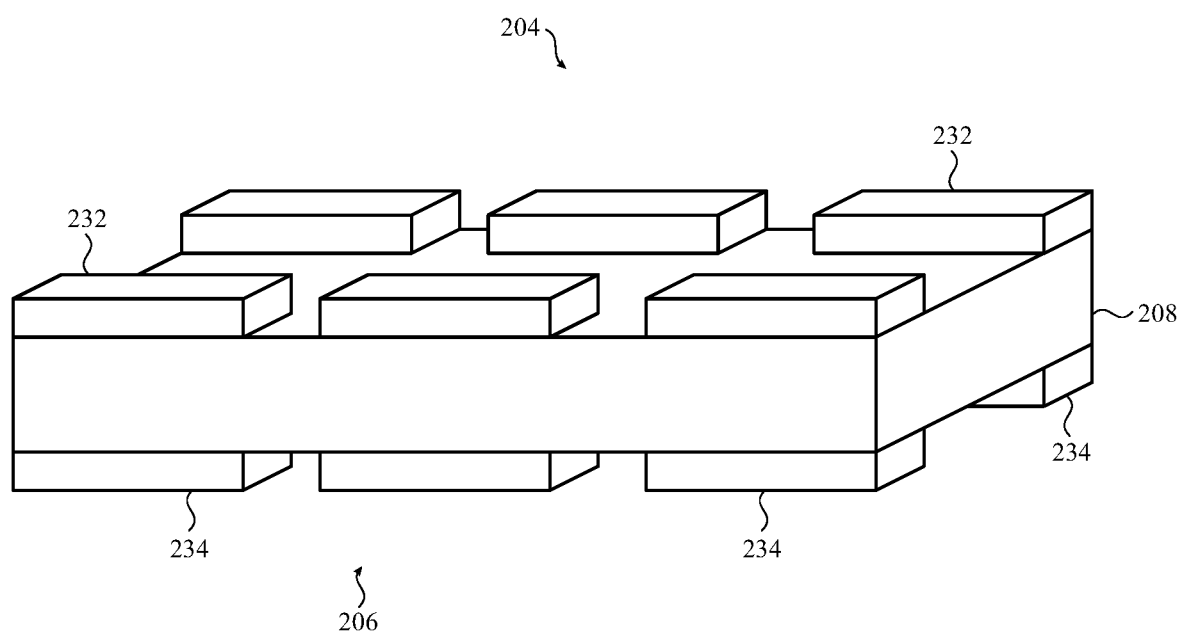
FIG. 8 shows a portion of a stack-up including sensor and drive pixels forming a configurable, force-sensitive input structure, according to embodiments.

As discussed herein, sense layer 204 and drive layer 206 of input structure 200 may capacitively detect a force (F) resulting from a user input. FIG. 8 shows a portion of sense layer 204, drive layer 206 and compliant layer 208 positioned therebetween. In the non-limiting example shown in FIG. 8, sense layer 204 may be formed from an array of sensor pixels 232, and drive layer 206 may be formed from an array of drive pixels 234. "Pixel," as used herein, does not necessarily refer to a pixel of a display device (e.g., an independently illuminable region of a display) but instead to a discrete electrode or other discrete electrical element that forms a portion of a sensor or sensing area.

Figure 9:
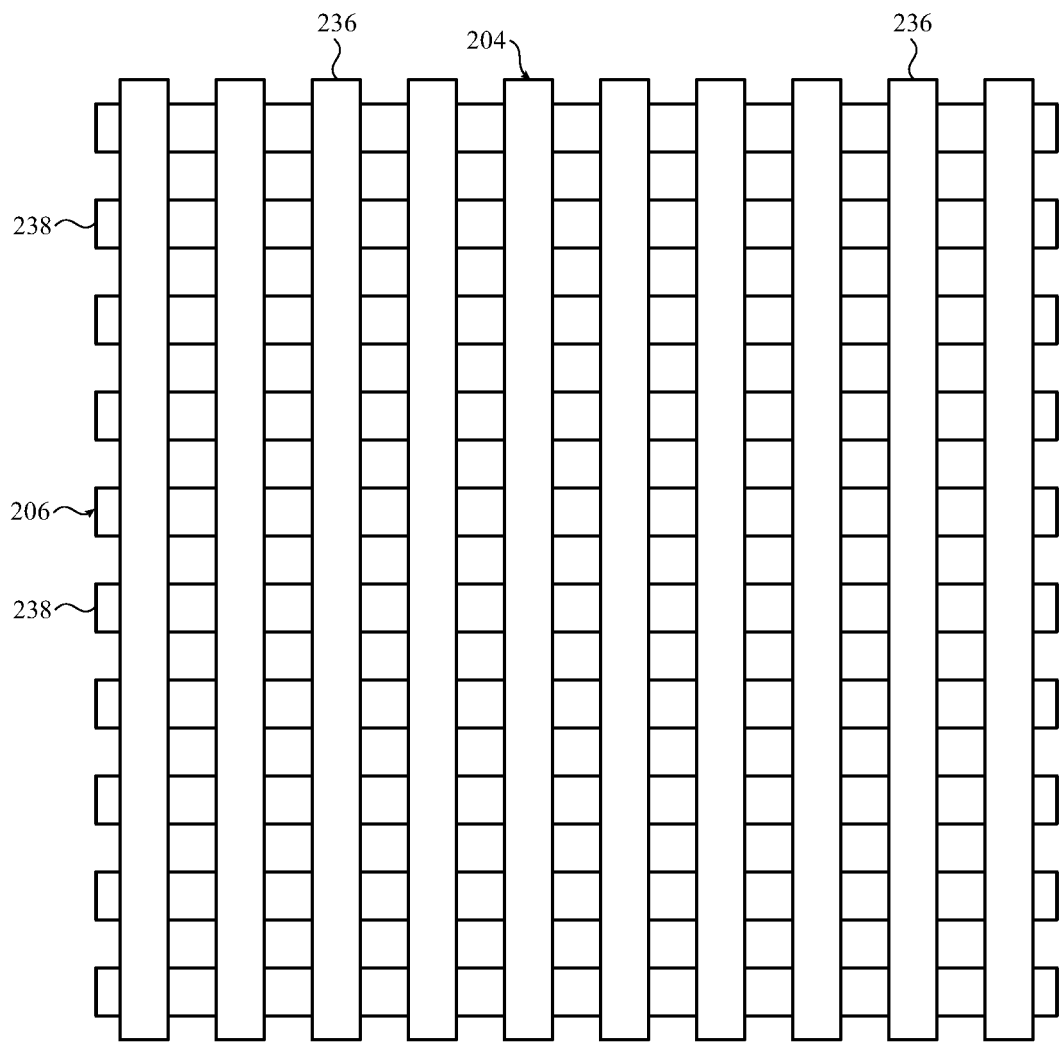
FIG. 9 shows a top view of a stack-up including sensor and drive columns forming a configurable, force-sensitive input structure, according to additional embodiments.

Each sensor pixel 232 of sense layer 204 may correspond to a single drive pixel 234 of drive layer 206, where the corresponding pixels of sense layer 204 and drive layer 206 may be aligned and positioned on opposite sides of compliant layer 208. Thus, each pair of sense and drive pixels may be considered a capacitor. As shown in the non-limiting example embodiment, sensor pixels 232 and drive pixels 234 may be aligned within the respective layer and may be positioned and/or coupled directly to compliant layer 208. In another non-limiting example, sensor pixels 232 of sense layer 204 and drive pixels 234 of drive layer 206 may be coupled to a substrate (not shown) for positioning the electrodes on a separate and distinct layer of input structure 200. As discussed herein, a single sensor pixel 232 and corresponding drive pixel 234 may be used by a single input component or button of input structure 200, or an array of sensor pixels 232 and corresponding drive pixels 234 may be used by a single input component or button. The change in capacitance may be detected when the distance between the sensor pixels 232 and drive pixels 234 varies as a result of deformation in the contact portion 104. The change in capacitance may indicate a force applied by a user providing an input to electronic device 100. Additionally, a location in which the change in capacitance occurs may indicate the location of the force applied by the user. That is, embodiments described herein may localize a force by determining a pair of pixels underlying or otherwise corresponding to a location at which the force is applied, for example because the change in capacitance is greatest at that intersection. Thus, embodiments described herein may sense not only force but also a location at which a force is applied and thus, a location of a touch or force. In yet another embodiment, only one layer or array of pixels may be used; the pixels may be mutually capacitive with respect to adjacent pixels. Changes in this mutual capacitance may be used to detect either or both of a location and amount of force, as described above In another non-limiting example, as shown in FIG. 9, sense layer 204 may be formed from multiple sensor capacitive columns 236 arranged in a first direction. Additionally in the non-limiting example, drive layer 206 may be formed from multiple drive capacitive rows 238 arranged in a second direction, distinct from the first direction. Although not shown, the respective capacitive columns 236 and capacitive rows 238 forming sense layer 204 and drive layer 206 of input structure 200 may be separated by compliant layer 208, as discussed herein. When sense layer 204 utilizes sensor capacitive columns 236, and drive layer 206 is formed from drive capacitive rows 238, a change in capacitance at an intersection of sensor capacitive columns 236 and drive capacitive rows 238 may indicate a force applied by a user providing an input to electronic device 100. To detect the change in capacitance at an intersection, a charge or current may be repeatedly provided through each of sensor capacitive columns 236 or drive capacitive rows 238 in a predetermined sequence. When a detected capacitance varies from a steady or uncompressed state capacitance, the location and/or amount of the force applied to sense layer 204 may be detected. A location of touch may be determined in a similar fashion to that previously described with respect to FIG. 8; e.g., by determining a location corresponding to an intersection of a drive row and sense column experiencing or reporting a greatest change in capacitance.

Figure 10:
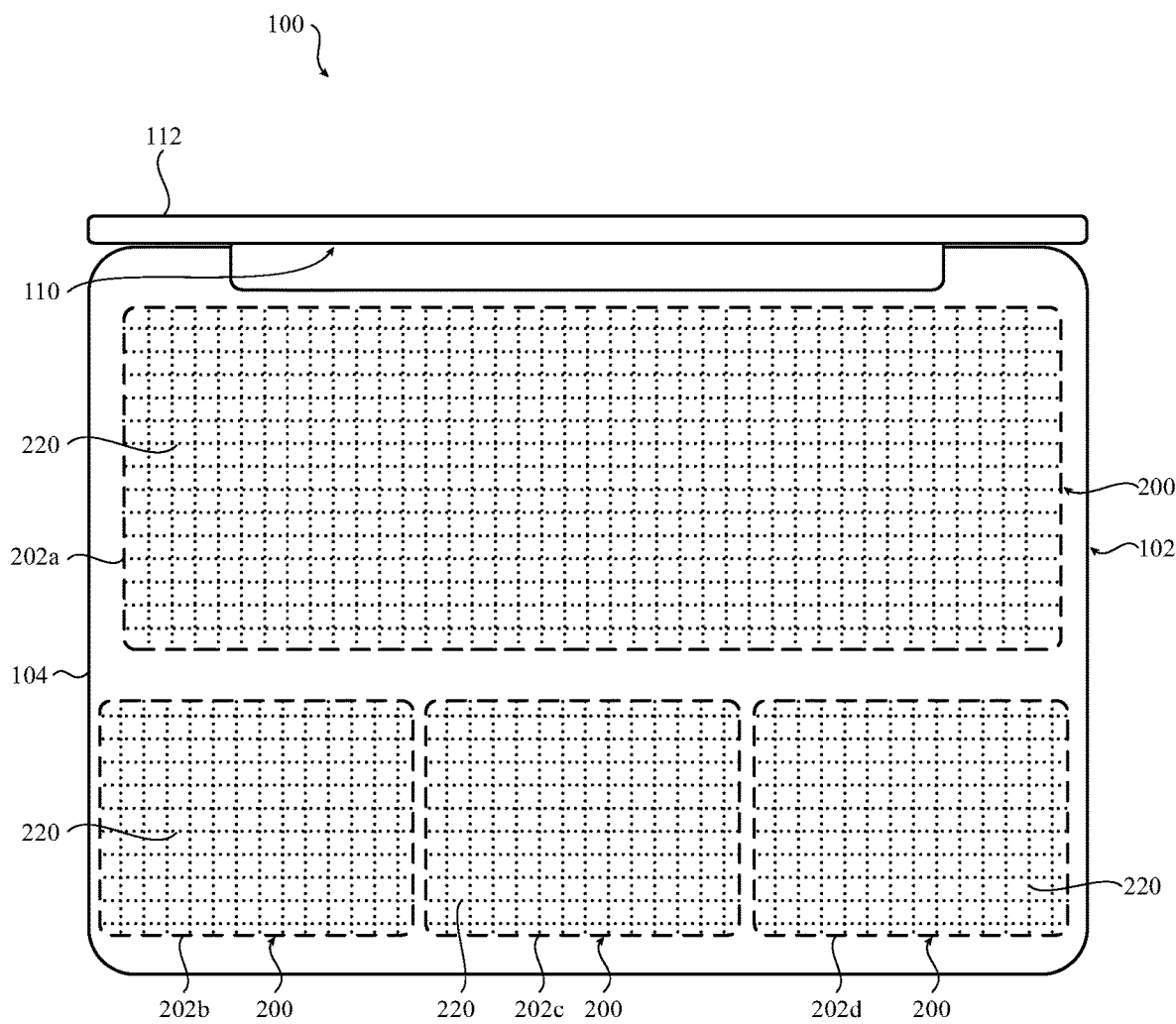
FIG. 10 shows a top view of an electronic device including a configurable, force-sensitive input structure, according to further embodiments. The input areas of the configurable, force-sensitive input structure are shown prior to being configured as specific input devices for the electronic device.

FIG. 10 shows a top view of electronic device 100 including input structure 200. As shown in FIG. 10 and discussed herein with respect to FIGS. 2 and 3, casing 102 may have a group of micro-perforations or holes 220 (shown in phantom) formed through contact portion 104. In the non-limiting example, holes 220 may be formed through contact portion 104 in predetermined input areas 202a, 202b, 202c, 202d of electronic device 100. Each of the input areas 202a, 202b, 202c, 202d may include a group of holes 220. Additionally, and as discussed herein, input areas 202a, 202b, 202c, 202d, when configured, may have boundaries defined by illuminated holes 220. Although shown as being arranged in a grid geometry, it is understood that the group of holes 220 formed through contact portion 104 may be positioned in any geometry or configuration within contact portion 104. Additionally, it is understood that holes 220 may be formed over the entire surface of contact portion 104; however, only those holes 220 formed in input areas 202a, 202b, 202c, 202d may be visible by a user when a light is provided by light guide layer 218 and/or light source 222, as discussed herein.

Figure 11:
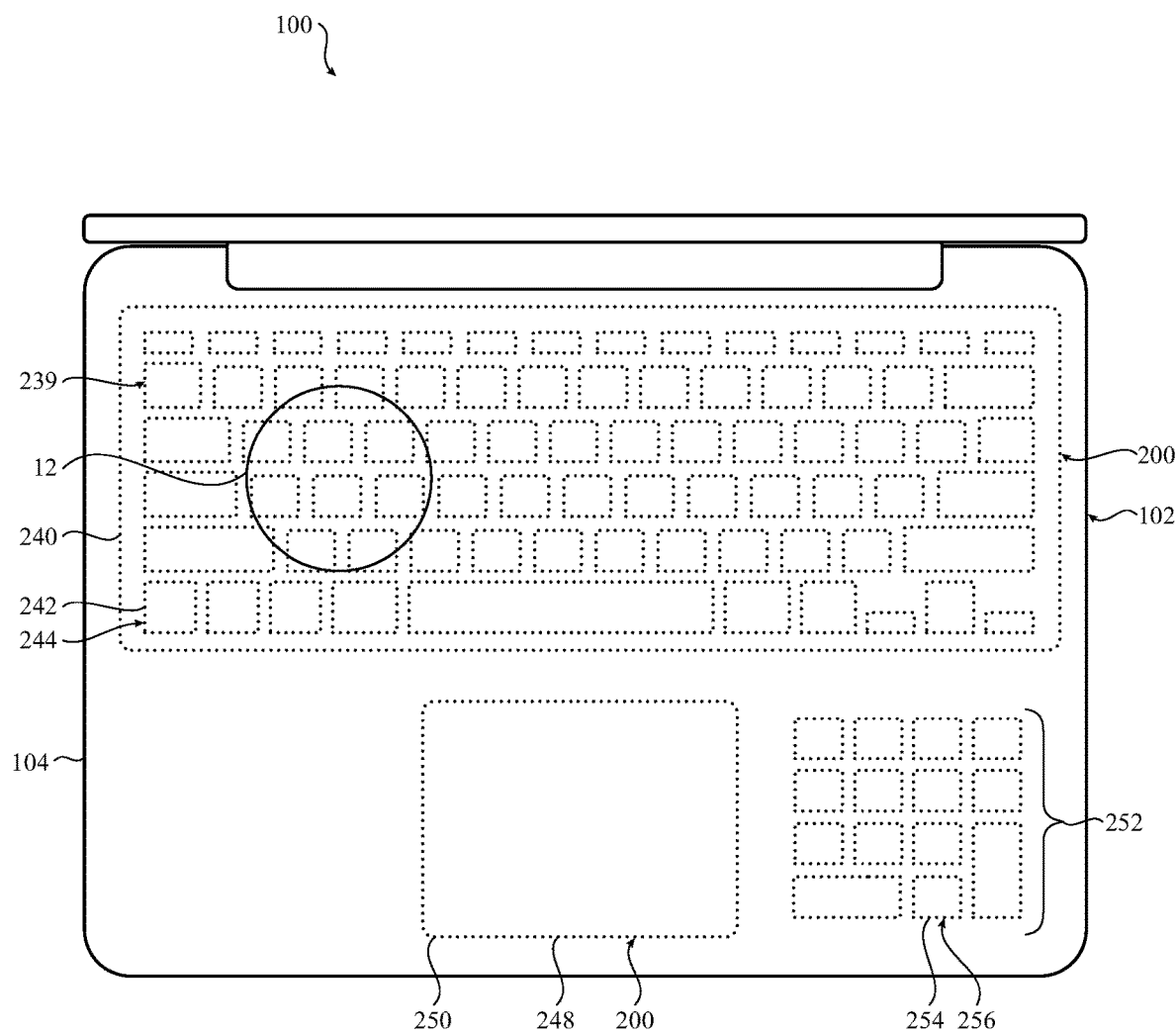
FIG. 11 shows a top view of the electronic device including the configurable, force-sensitive input structure of FIG. 10, according to further embodiments. The input areas of the configurable, force-sensitive input structure are shown subsequent to being configured as specific input devices for the electronic device.

FIG. 11 shows a top view of electronic device 100 and input structure 200 configured as specific input areas corresponding to particular input devices or structures. As shown in FIG. 11, and with continued reference to FIG. 10, input areas 202a, 202c, 202d (see, FIG. 10) may be configured to be interacted with by a user of electronic device 100, where each input area 202a, 202c, 202d is configured as a distinct input device. Input area 202b (see, FIG. 10) may not be configured as an input device, and therefore may be deactivated or selectively inoperable for electronic device 100. Further, each of the input areas may be different, unique parts of the contact portion and/or input structure 200; any or all of such regions may vary in size, shape, or other dimension from one another and the overall input structure and/or contact portion. Accordingly, the input structure may be considered dimensionally configurable insofar as the distinct input areas formed thereon may vary in dimensions, and such dimension may be changed depending on the function of the input area and/or user preference.

In the non-limiting example shown in FIG. 11, select holes 220 formed through contact portion 104 in active input areas 202a, 202c, 202d may be illuminated by light guide layer 218 and/or light source 222 to visually indicate to a user that these input areas are interactive. For example, where input structure 200 formed below input area 202a (see, FIG. 10) is configured as a QWERTY keyboard input device 239 (hereafter, "QWERTY keyboard 239"), select holes 220 of contact portion 104 may be illuminated to form an input area boundary 240, and individual keycap boundaries 242 to form individual input keys 244 of the QWERTY keyboard 239. The input area boundary 240 may indicate where input areas 202a ends and keycap boundaries 242 may indicate to a user where each input key 244 of the QWERTY keyboard 239 is located within input area 202a.

Figure 12:
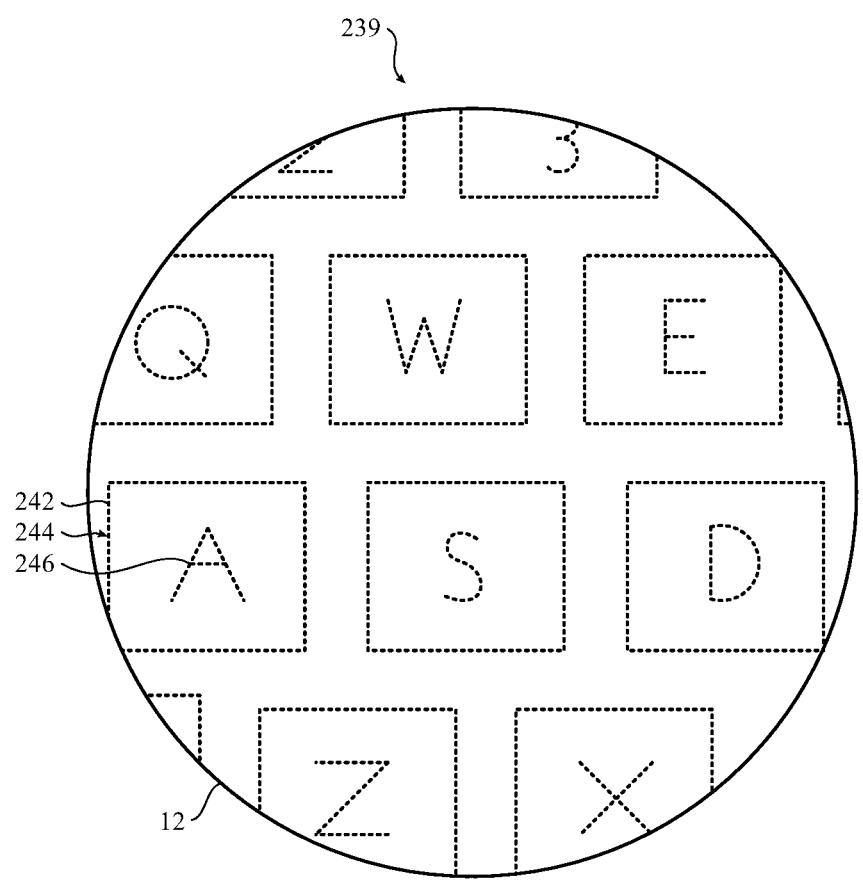
FIG. 12 shows an enlarged top view of a portion of the electronic device of FIG. 11, according to further embodiments.

Briefly turning to FIG. 12, an enlarged portion 12 (see, FIG. 11) of the input structure 200 formed within input area 202a is shown. Select holes 220 formed through contact portion 104 of electronic device 100 may also be illuminated to provide a key glyph 246 to a user of electronic device 100. As shown in the non-limiting example of FIG. 12, each illuminated input key 244 may have an illuminated key glyph 246 corresponding to the respective input key 244 of the QWERTY keyboard 239 formed in input area 202a. Illuminated glyph 246 micro-perforations are not shown in FIG. 11 for clarity.

Returning to FIG. 11, input areas 202c, 202d (see, FIG. 10) may also be configured as distinct input devices using input structure 200. In the non-limiting example, input area 202c formed from input structure 200 may be configured as a track pad 248. As shown in the non-limiting example of FIG. 11, holes 220 positioned within input area 202c of input structure 200 may provide a track pad boundary 250 for the track pad 248. The track pad boundary 250 may provide the user with a visual indicator of where the functional portion of track pad 248 ends on contact portion 104 of electronic device 100. Further, it should be appreciated that the input areas 202c, 202d have different dimensions that the input area 202a.

In a further non-limiting example shown in FIG. 11, input area 202d (see, FIG. 10) may be configured as a number keypad 252. In the non-limiting example, and similarly discussed with respect to QWERTY keyboard 239 and input area 202a above, number keypad 252 may have individual keycap boundaries 254, defined by selectively illuminating holes 220 of contact portion 104, to form number keypad input keys 256. The number keypad input keys 256 may include keys corresponding to numbers and/or mathematical operations, such as, addition, subtraction, multiplication and so on. Unlike input area boundary 240 of QWERTY keyboard 239 and track pad boundary 250 of track pad 248, number keypad 252 formed in input area 202d may not include area boundary indicators. That is, as shown in FIG. 11, number keypad 252 may only include keycap boundaries 254 for each of number keypad input keys 256, and may not include a boundary indicating where input area 202d ends on contact portion 104 of electronic device 100.

As briefly discussed herein, haptic feedback module 226 (see, FIG. 4) may be in electrical communication with each of the input areas 202a, 202b, 202c, 202d of input structure 200 formed within electronic device 100. Haptic feedback module 226 may provide haptic signals to the input areas 202a, 202b, 202c, 202d and/or to contact portion 104 of electronic device 100 to be felt or experienced by a user of electronic device 100. The haptic signals provided to contact portion 104 may be dependent upon the type of input device included in input areas 202a, 202b, 202c, 202d, as configured by input structure 200, and/or the detected action of the user within the input areas 202a, 202b, 202c, 202d.

In a non-limiting example, haptic feedback module 226 (see, FIG. 4) may provide a haptic signal to input area 202a and/or contact portion 104 when a user presses an input key 244 of QWERTY keyboard 239 to interact with electronic device 100. The haptic signal provided by haptic feedback module 226 may simulate the feeling of depressing a key assembly in a conventional keyboard. A similar haptic signal may be provided by the haptic feedback module 226 to contact portion 104 and/or input area 202d when a user presses an input key 256 of number keypad 252. Additionally, a haptic signal may be provided by the haptic feedback module 226 to contact portion 104 and/or input area 202c when a user presses track pad 248 to provide an input.

Haptic feedback module 226 (see, FIG. 4) may also provide a haptic signal to contact portion 104 as an indicator or warning that the user is close to the boundary of the input area 202a, 202b, 202c, 202d which the user is interacting with. In a non-limiting example shown in FIG. 11, haptic feedback module 226 may provide a haptic signal to contact portion 104 and/or input area 202c, when a user moves their finger close to and/or on track pad boundary 250 for track pad 248. Once the haptic signal is felt, the user may reposition their finger within track pad 248 before exiting input area 202c and interacting with a portion of contact portion outside of input area 202c.

Although shown as distinct input devices, input structure 200 may be configured to recognize inputs corresponding to other input devices. In a non-limiting example in FIG. 11, input structure 200 forming QWERTY keyboard 239 in input area 202a may be configured to recognize touch and/or finger-motions used on track pad 248 in input area 202c. The sense layer 204 and drive layer 206 of input structure 200 (see, FIG. 2) may sense a user's swiping motion with at least one finger along contact portion 104 in input area 202a, configured as QWERTY keyboard 239, in a similar fashion or manner as in input area 202c configured as track pad 248. As a result, a user of electronic device 100 may not be required to move their fingers from input area 202a to input area 202c, but rather, may use input area 202a as QWERTY keyboard 239 and track pad 248.

Figure 13A:
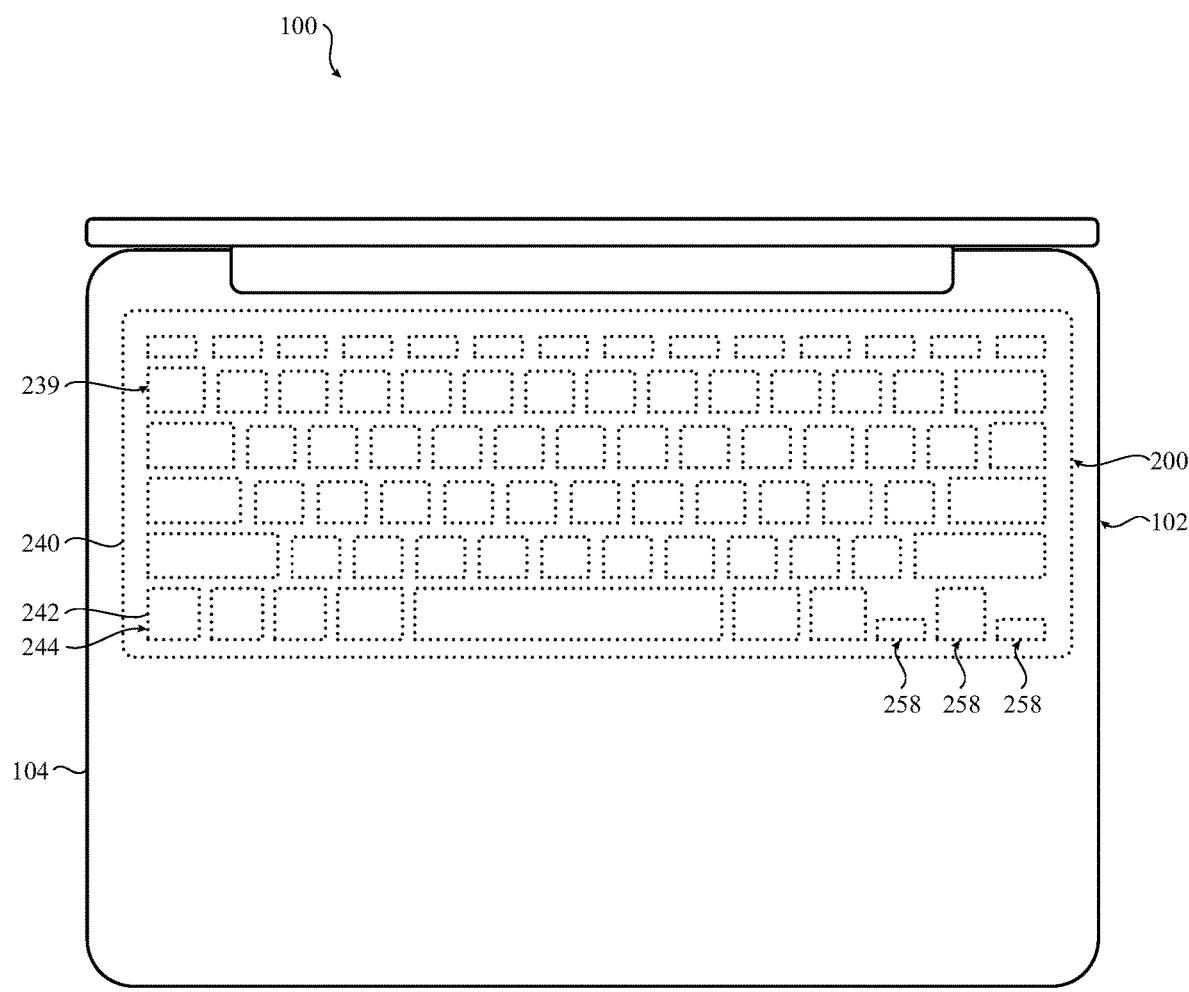
FIG. 13A shows a top view of an electronic device including a configurable, force-sensitive input structure in a first configuration including a keyboard, according to embodiments.

Input structure 200 may dynamically change dimension and/or configuration of the input device based on the operational mode of the electronic device 100. In a further non-limiting example, as shown in FIG. 13A, input structure 200 aligned with input area 202a may be initially configured as a QWERTY keyboard 239, similar to input structure 200 discussed herein with respect to FIG. 11. Input structure 200 configured as QWERTY keyboard 239 may include, for example, directional buttons 258. As shown in FIG. 13A, when electronic device 100 is being used in a conventional operation mode or with a conventional program (e.g., word processing, internet browsing and the like), directional buttons 258 of QWERTY keyboard 239 may be positioned in a lower portion of input area 202a, opposite from the alphabetical and symbolic input keys 244.

Figure 13B:
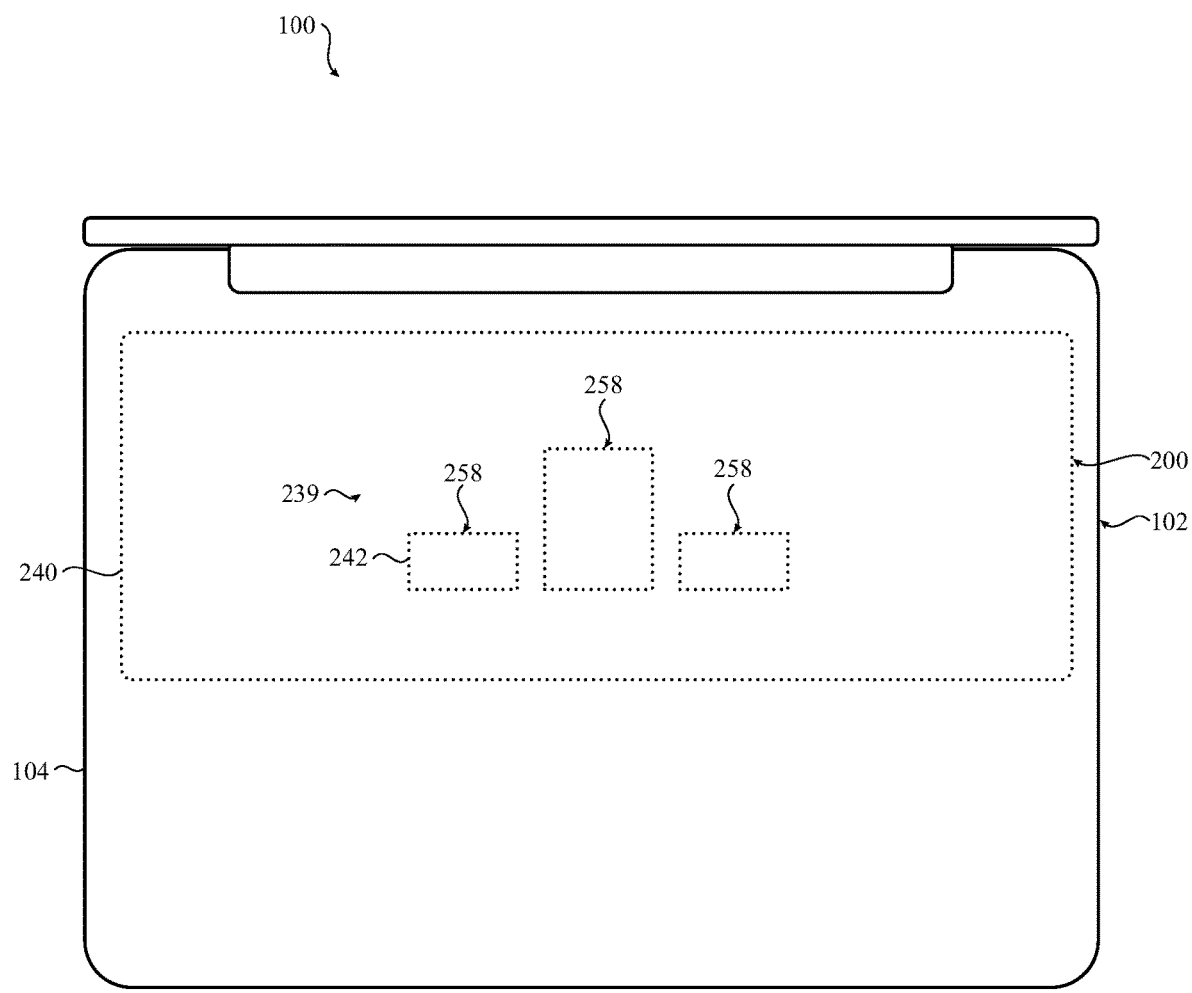
FIG. 13B shows a top view of an electronic device including a configurable, force-sensitive input structure in a second configuration including only directional buttons of the keyboard shown in FIG. 13A, according to embodiments.

However, when electronic device 100 is being used with a unique operation mode or with a unique program, input structure 200 may dynamically change its shape and/or configuration, or other dimensions, based on the unique operation mode or program. Continuing the non-limiting example of FIG. 13A, FIG. 13B may depict electronic device 100 being used to run a unique program (for example, an interactive game) that may only utilize directional buttons 258. As a result, input structure 200 may be reconfigured to only display and/or provide directional buttons 258 to a user of electronic device 100. As shown in FIG. 13B, input structure 200 may adjust its configuration to only display directional buttons 258, and may reposition directional buttons 258 to a center of input area 202a. Additionally in the non-limiting example and with comparison to FIG. 13A, input structure 200 may enlarge directional buttons 258 as well. The reconfiguration, repositioning and/or resizing of directional buttons 258 of input structure 200 may be achieved by modifying or adjusting the selected holes 220 of contact portion 104 that may be illuminated by input structure 200, as discussed herein.

Figure 14:
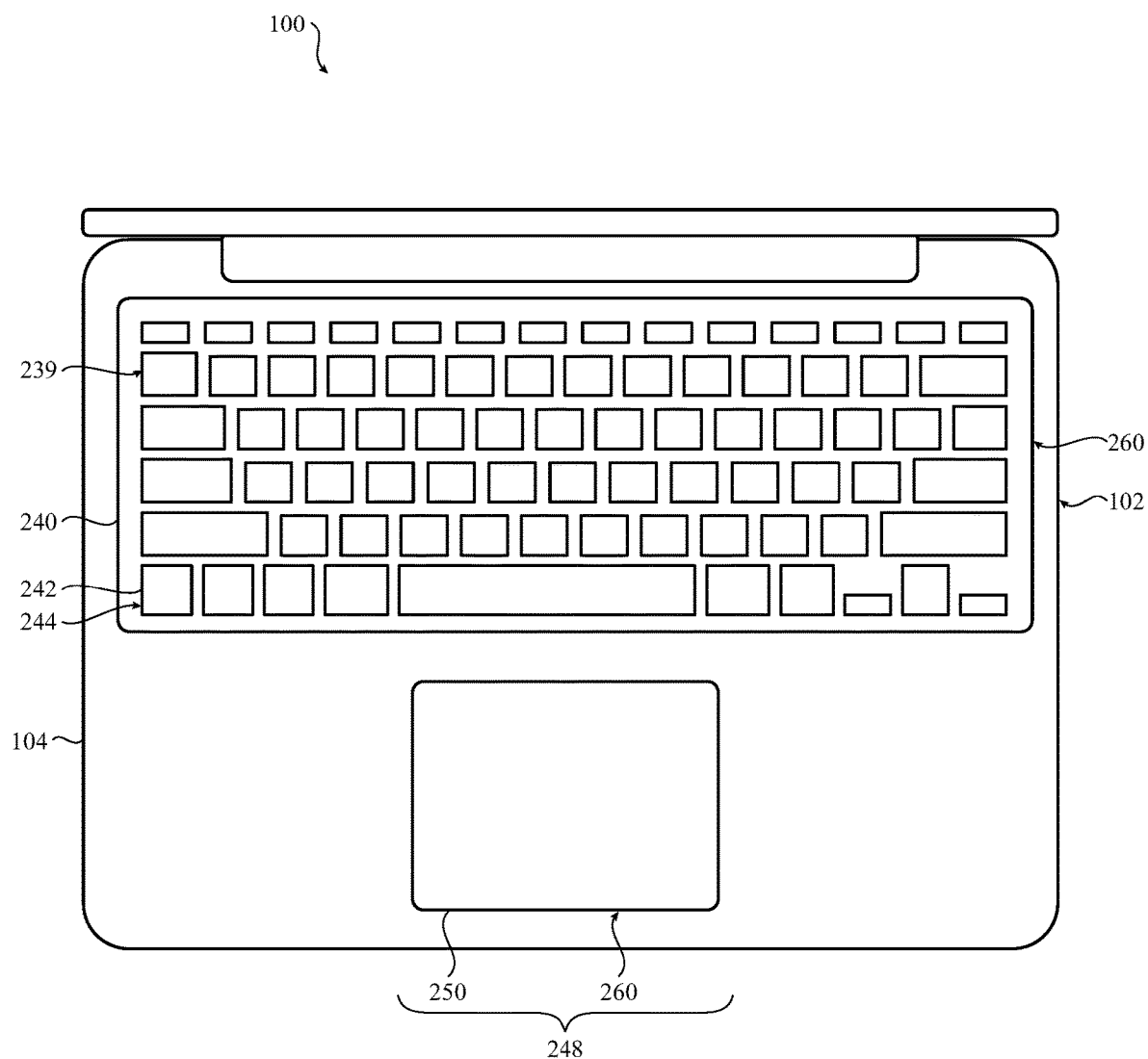
FIG. 14 shows a top view of an electronic device including a configurable, force-sensitive input structure having a patterned contact surface, according to embodiments.

In another non-limiting example shown in FIG. 14, contact portion 104 of electronic device 100 may be patterned. With comparison to FIG. 11, contact portion 104 of electronic device 100 may not include holes 220 (see, FIG. 11), but rather may be patterned to show features of input structure 200 on contact portion 104. In the non-limiting example shown in FIG. 14, contact portion 104 may include pattern 260 to show input area boundary 240, and individual keycap boundaries 242 to form input keys 244 in input area 202a (see, FIG. 10). Additionally in the non-limiting example, contact portion 104 may be patterned 260 to form track pad boundary 250 for track pad 248 in input area 202c (see, FIG. 10). Pattern 260 of contact portion 104 may be formed using any suitable technique or process including, but not limited to, etching, casting, molding, depositing, grinding, milling or the like.

Figure 15A:
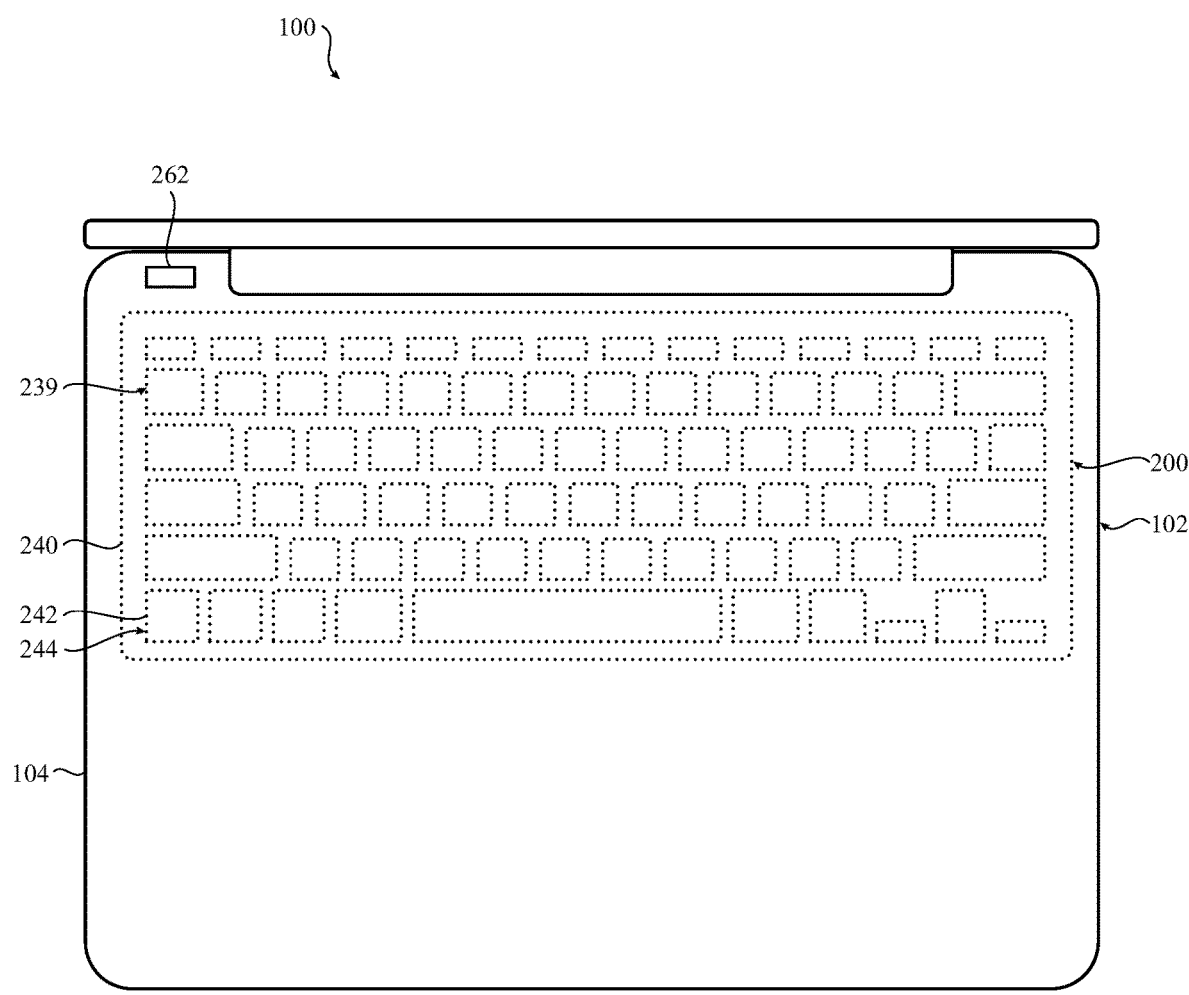
FIG. 15A shows top view of an electronic device including a configurable, force-sensitive input structure in a first operational mode including a keyboard and a mode key, according to embodiments.
Figure 15B:
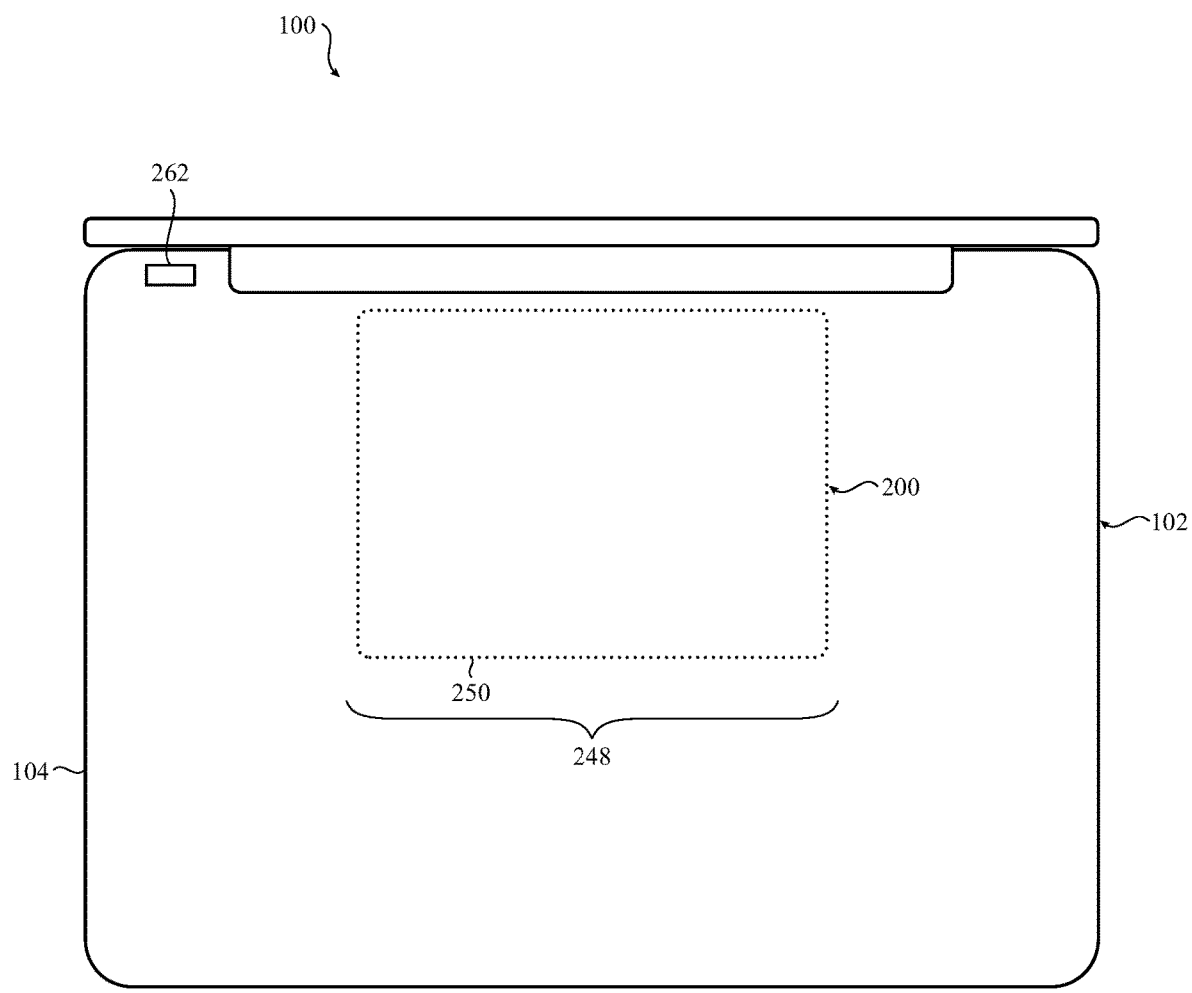
FIG. 15B shows a top view of an electronic device including a configurable, force-sensitive input structure in a second operational mode including a track pad and the mode key, according to embodiments.

As discussed herein, input structure 200 may be configured as a variety of distinct, interchangeable input devices for electronic device 100. In a non-limiting example as shown in FIGS. 15A and 15B, a single input structure 200 of electronic device 100 may be configured to have two distinct operational modes or input devices, where each input device of input structure 200 is a distinct input device. As shown in FIG. 15A, input structure 200 may be configured in a first operational mode or as a first input device, where the first input device may correspond to or may configure input structure 200 as a QWERTY keyboard 239. Distinctly, FIG. 15B shows input structure 200 of electronic device 100 configured in a second operational mode or as a second input device, distinct from the first input device of input structure 200 shown in FIG. 15A. Second operational mode or second input device of input structure 200 may correspond to or be configured as a track pad 248.

Input structure 200 may be switched or toggled between the first input device and the second input device using a mode key 262. As shown in FIGS. 15A and 15B, mode key 262 included in electronic device 100 may be in electrical communication with input structure 200. Based on a user's operational need for input structure 200, mode key 262 may be used to toggle or switch input structure 200 between the first operational mode or first input device (e.g., QWERTY keyboard 239, FIG. 15A), and the second operational mode or second input device (e.g., track pad 248, FIG. 15B). Although shown in FIGS. 15A and 15B as being a button or key distinct from input structure 200, it is understood that mode key 262 may be incorporated as an input key included in input structure 200.

The foregoing description, for purposes of explanation, used specific nomenclature to provide a thorough understanding of the described embodiments. However, it will be apparent to one skilled in the art that the specific details are not required in order to practice the described embodiments. For example, embodiments described herein could be incorporated into a mouse or other input device to provide afore-described functionality to such input devices. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device comprising:
   an upper housing defining an opening;
   a display positioned at least partially within the opening;
   a casing coupled to the upper housing and comprising a contact layer defining a group of holes extending through the contact layer;
   a light source positioned within the casing and below the group of holes, the light source configured to:
      in a first mode of operation of the electronic device, illuminate a first set of holes of the group of holes to define, at a first region of a first input area, a keyboard in which at least a portion of the illuminated first set of holes defines a set of individual input keys; and
      in a second mode of operation of the electronic device, illuminate a second set of holes of the group of holes to define, at a second region of the first input area, an input element having a shape different from the keyboard, the second region at least partially overlapping the first region; and
      illuminate a third set of holes of the group of holes to define a second input area, the second input area configured as a track pad; and
   an input structure positioned within the casing and below the group of holes, the input structure configured to detect a force exerted within any one of the first input area or the second input area and a location of the force exerted within any one of the first input area or the second input area, the input structure comprising:
      a sense layer;
      a drive layer capacitively coupled to the sense layer; and
      a compliant layer positioned between the sense layer and the drive layer.

2. The electronic device of claim 1, further comprising a haptic feedback module positioned within the casing and communicatively coupled with the input structure, the haptic feedback module configured to provide a haptic feedback in response to the input structure detecting the force and the location of the force.

3. The electronic device of claim 2, wherein:
   when the location of the force is within the first input area during the first mode of operation, the haptic feedback module provides a haptic signal to at least an input key of the set of individual input keys; and
   the haptic signal simulates a depression of a mechanical key.

4. The electronic device of claim 2, wherein, when the location of the force is proximate to a boundary of the second input area, the haptic feedback module provides a haptic signal to the second input area.

5. The electronic device of claim 1, wherein:
   the light source is further configured to illuminate a fourth set of holes of the group of holes to define a third input area;
   the set of individual input keys is a first set of individual input keys; and
   the illuminated fourth set of holes defines a second set of individual input keys of a number pad.

6. The electronic device of claim 1, wherein the casing further defines a border portion, the border portion separating the first input area and the second input area.

7. The electronic device of claim 6, wherein the border portion is devoid of holes.

8. An input structure comprising:
a contact layer defining a set of input regions areas and a group of holes extending through the contact layer;
a light guide layer positioned below the contact layer and configured to:
in a first mode of operation, illuminate a first set of holes of the group of holes to define, at a first region of a first input area of the set of input areas, a keyboard;
in a second mode of operation, illuminate a second set of holes of the group of holes to define, at a second region of the first input area, an input element having a shape different from the keyboard; and
illuminate a third set of holes of the group of holes to define a second input area of the set of input areas, the second input area configured as a track pad;
a sense layer positioned below the light guide layer;
a drive layer positioned below the light guide layer and the sense layer, the drive layer configured to detect an input force applied to the contact layer; and
a compliant layer positioned between the sense layer and the drive layer, the compliant layer formed from an at least partially elastic material.

9. The input structure of claim 8, further comprising a set of supports positioned below the contact layer, the set of supports resisting deformation of the contact layer within a non-input region of the contact layer and preventing the drive layer and the sense layer from detecting the input force within the non-input region.

10. The input structure of claim 8, wherein the input structure is configured to detect a location of the input force within at least one of the first input area or the second input area.

11. The input structure of claim 10, further comprising a haptic feedback module positioned below the contact layer and in electrical communication with at least one of the sense layer or the drive layer, the haptic feedback module configured to provide haptic feedback in response to the input structure detecting the input force.

12. The input structure of claim 11, wherein, in the first mode of operation and when the location of the input force is within the first input area, the haptic feedback is configured to simulate a depression of a mechanical key switch.

13. The input structure of claim 11, wherein the haptic feedback module provides the haptic feedback when the location of the input force is proximate to a boundary of the second input area.

14. The input structure of claim 8, further configured to:
detect a gesture applied to the contact layer; and
in response to the detected gesture, change at least one of a size or a shape of a displayed boundary of the second input area.

15. An electronic device comprising:
a casing defining an exterior surface of the electronic device and defining a group of holes extending through the casing;
a light guide layer below the casing and configured to:
in a first mode of operation, illuminate a first set of holes of the group of holes to define a first set of keys in a first region of a first input area;
in a second mode of operation, illuminate a second set of holes of the group of holes to define a second set of keys in a second region of the first input area, the second region at least partially overlapping the first region; and
illuminate a third set of holes of the group of holes to define a track pad region in a second input area; and
an input stack-up configured to detect a deformation of the exterior surface and a location of the deformation within at least one of the first input area or the second input area.

16. The electronic device of claim 15, wherein:
the first set of keys defines a keyboard;
the second set of keys defines a number pad; and
each respective key of the first set of keys and the second set of keys includes a respective illuminated glyph.

17. The electronic device of claim 16, wherein:
the illuminated third set of holes defines a boundary of the track pad region; and
in response to a gesture input on a contact portion and detected by the input stack-up, the boundary of the track pad region varies in accordance with the gesture input.

18. The electronic device of claim 15, further comprising a haptic feedback module configured to provide haptic feedback in response to the input stack-up detecting the deformation and the location of the deformation.

19. The electronic device of claim 18, wherein, when the location of the deformation is within a key of the first set of keys, the haptic feedback is a simulated keypress actuation.

20. The electronic device of claim 15, wherein:
the track pad region is a first track pad region;
the third set of holes is illuminated within a third region of the second input area; and
in a third mode of operation, the light guide layer illuminates a fourth set of holes of the group of holes in a fourth region of the second input area to define a differently sized track pad region, the fourth region overlapping the third region.

* * * * *

UNITED STATES PATENT AND TRADEMARK OFFICE
CERTIFICATE OF CORRECTION

| | |
|---|---|
| PATENT NO. | : 11,360,631 B2 |
| APPLICATION NO. | : 17/203363 |
| DATED | : June 14, 2022 |
| INVENTOR(S) | : John B. Morrell et al. |

It is certified that error appears in the above-identified patent and that said Letters Patent is hereby corrected as shown below:

In the Claims

Column 19, Line 2, Claim 8:
"a contact layer defining a set of input regions areas and a"
Should read as --a contact layer defining a set of input areas and a--

Signed and Sealed this
Eleventh Day of October, 2022

Katherine Kelly Vidal
*Director of the United States Patent and Trademark Office*